United States Patent
Roy et al.

(10) Patent No.: US 12,488,872 B2
(45) Date of Patent: Dec. 2, 2025

(54) DEFAULT CARBOHYDRATE CONSUMPTION COUNTS BASED ON POPULATION CARBOHYDRATE CONSUMPTION MODELS

(71) Applicant: Medtronic MiniMed, Inc., Northridge, CA (US)

(72) Inventors: Anirban Roy, Agoura Hills, CA (US); Benyamin Grosman, Winnetka, CA (US); Louis J. Lintereur, Boise, ID (US); Peter Onesti, Valencia, CA (US); Di Wu, Palo Alto, CA (US); Neha J. Parikh, West Hills, CA (US)

(73) Assignee: MEDTRONIC MINIMED, INC., Northridge, CA (US)

( * ) Notice: Subject to any disclaimer, the term of this patent is extended or adjusted under 35 U.S.C. 154(b) by 878 days.

(21) Appl. No.: 17/336,912

(22) Filed: Jun. 2, 2021

(65) Prior Publication Data

US 2021/0398639 A1 Dec. 23, 2021

Related U.S. Application Data

(60) Provisional application No. 63/041,633, filed on Jun. 19, 2020.

(51) Int. Cl.
G16H 20/17 (2018.01)
A61M 5/172 (2006.01)
(Continued)

(52) U.S. Cl.
CPC .......... *G16H 20/17* (2018.01); *A61M 5/1723* (2013.01); *G06N 3/08* (2013.01); *G16H 10/00* (2018.01);
(Continued)

(58) Field of Classification Search
None
See application file for complete search history.

(56) References Cited

U.S. PATENT DOCUMENTS 4,562,751 A 1/1986 Nason et al.
4,685,903 A 8/1987 Cable et al.
(Continued)

OTHER PUBLICATIONS

International Search Report and Written Opinion of the International Searching Authority issued in corresponding application PCT/US2021/036737 mailed Sep. 10, 2021 (15 pages).
(Continued)

*Primary Examiner* — Courtney B Fredrickson
*Assistant Examiner* — Kayla M. Turkowski
(74) *Attorney, Agent, or Firm* — Weaver Austin Villeneuve & Sampson LLP

(57) ABSTRACT

Techniques disclosed herein relates generally to default carbohydrate consumption counts based on population carbohydrate consumption models. In one example, the techniques involve receiving, from a device, at least one characteristic of a person; accessing a population carbohydrate consumption model which relates the at least one characteristic with carbohydrate intake for a population; determining, based on applying the population carbohydrate consumption model to the at least one characteristic, at least one of: a preliminary carbohydrate count for the person or a default carbohydrate consumption count for the person; and causing delivery of insulin to the person based on communicating, to the device, at least one of: the preliminary carbohydrate count for the person or the default carbohydrate consumption count for the person.

20 Claims, 11 Drawing Sheets

(51) Int. Cl.
*G06N 3/08* (2023.01)
*G16H 10/00* (2018.01)
*G16H 20/60* (2018.01)

(52) U.S. Cl.
CPC ....... *G16H 20/60* (2018.01); *A61M 2205/502* (2013.01)

(56) References Cited

U.S. PATENT DOCUMENTS

| | | | |
|---|---|---|---|
| 4,755,173 A | 7/1988 | Konopka et al. |
| 5,080,653 A | 1/1992 | Voss et al. |
| 5,097,122 A | 3/1992 | Colman et al. |
| 5,391,250 A | 2/1995 | Cheney, II et al. |
| 5,485,408 A | 1/1996 | Blomquist |
| 5,505,709 A | 4/1996 | Funderburk et al. |
| 5,522,803 A | 6/1996 | Teissen-Simony |
| 5,665,065 A | 9/1997 | Colman et al. |
| 5,800,420 A | 9/1998 | Gross et al. |
| 5,807,375 A | 9/1998 | Gross et al. |
| 5,925,021 A | 7/1999 | Castellano et al. |
| 5,954,643 A | 9/1999 | Van Antwerp et al. |
| 6,017,328 A | 1/2000 | Fischell et al. |
| 6,088,608 A | 7/2000 | Schulman et al. |
| 6,119,028 A | 9/2000 | Schulman et al. |
| 6,186,982 B1 | 2/2001 | Gross et al. |
| 6,246,992 B1 | 6/2001 | Brown |
| 6,248,067 B1 | 6/2001 | Causey, III et al. |
| 6,248,093 B1 | 6/2001 | Moberg |
| 6,355,021 B1 | 3/2002 | Nielsen et al. |
| 6,379,301 B1 | 4/2002 | Worthington et al. |
| 6,485,465 B2 | 11/2002 | Moberg et al. |
| 6,544,212 B2 | 4/2003 | Galley et al. |
| 6,554,798 B1 | 4/2003 | Mann et al. |
| 6,558,320 B1 | 5/2003 | Causey, III et al. |
| 6,558,351 B1 | 5/2003 | Steil et al. |
| 6,589,229 B1 | 7/2003 | Connelly et al. |
| 6,591,876 B2 | 7/2003 | Safabash |
| 6,641,533 B2 | 11/2003 | Causey, III et al. |
| 6,659,980 B2 | 12/2003 | Moberg et al. |
| 6,736,797 B1 | 5/2004 | Larsen et al. |
| 6,740,072 B2 | 5/2004 | Starkweather et al. |
| 6,749,587 B2 | 6/2004 | Flaherty |
| 6,752,787 B1 | 6/2004 | Causey, III et al. |
| 6,766,183 B2 | 7/2004 | Walsh et al. |
| 6,801,420 B2 | 10/2004 | Talbot et al. |
| 6,804,544 B2 | 10/2004 | Van Antwerp et al. |
| 6,817,990 B2 | 11/2004 | Yap et al. |
| 6,827,702 B2 | 12/2004 | Lebel et al. |
| 6,932,584 B2 | 8/2005 | Gray et al. |
| 7,003,336 B2 | 2/2006 | Holker et al. |
| 7,029,444 B2 | 4/2006 | Shin et al. |
| 7,066,909 B1 | 6/2006 | Peter et al. |
| 7,137,964 B2 | 11/2006 | Flaherty |
| 7,303,549 B2 | 12/2007 | Flaherty et al. |
| 7,323,142 B2 | 1/2008 | Pendo et al. |
| 7,399,277 B2 | 7/2008 | Saidara et al. |
| 7,402,153 B2 | 7/2008 | Steil et al. |
| 7,442,186 B2 | 10/2008 | Blomquist |
| 7,602,310 B2 | 10/2009 | Mann et al. |
| 7,621,893 B2 | 11/2009 | Moberg et al. |
| 7,647,237 B2 | 1/2010 | Malave et al. |
| 7,699,807 B2 | 4/2010 | Faust et al. |
| 7,727,148 B2 | 6/2010 | Talbot et al. |
| 7,785,313 B2 | 8/2010 | Mastrototaro |
| 7,806,886 B2 | 10/2010 | Kanderian, Jr. et al. |
| 7,819,843 B2 | 10/2010 | Mann et al. |
| 7,828,764 B2 | 11/2010 | Moberg et al. |
| 7,879,010 B2 | 2/2011 | Nunn et al. |
| 7,890,295 B2 | 2/2011 | Shin et al. |
| 7,892,206 B2 | 2/2011 | Moberg et al. |
| 7,892,748 B2 | 2/2011 | Norrild et al. |
| 7,901,394 B2 | 3/2011 | Ireland et al. |
| 7,942,844 B2 | 5/2011 | Moberg et al. |
| 7,946,985 B2 | 5/2011 | Mastrototaro et al. |
| 7,955,305 B2 | 6/2011 | Moberg et al. |
| 7,963,954 B2 | 6/2011 | Kavazov |
| 7,977,112 B2 | 7/2011 | Burke et al. |
| 7,979,259 B2 | 7/2011 | Brown |
| 7,985,330 B2 | 7/2011 | Wang et al. |
| 8,024,201 B2 | 9/2011 | Brown |
| 8,100,852 B2 | 1/2012 | Moberg et al. |
| 8,114,268 B2 | 2/2012 | Wang et al. |
| 8,114,269 B2 | 2/2012 | Cooper et al. |
| 8,137,314 B2 | 3/2012 | Mounce et al. |
| 8,181,849 B2 | 5/2012 | Bazargan et al. |
| 8,182,462 B2 | 5/2012 | Stoc et al. |
| 8,192,395 B2 | 6/2012 | Estes et al. |
| 8,195,265 B2 | 6/2012 | Goode, Jr. et al. |
| 8,202,250 B2 | 6/2012 | Stutz, Jr. |
| 8,207,859 B2 | 6/2012 | Enegren et al. |
| 8,226,615 B2 | 7/2012 | Bikovsky |
| 8,257,259 B2 | 9/2012 | Brauker et al. |
| 8,267,921 B2 | 9/2012 | Yodfat et al. |
| 8,275,437 B2 | 9/2012 | Brauker et al. |
| 8,277,415 B2 | 10/2012 | Mounce et al. |
| 8,292,849 B2 | 10/2012 | Bobroff et al. |
| 8,298,172 B2 | 10/2012 | Nielsen et al. |
| 8,303,572 B2 | 11/2012 | Adair et al. |
| 8,305,580 B2 | 11/2012 | Aasmul |
| 8,308,679 B2 | 11/2012 | Hanson et al. |
| 8,313,433 B2 | 11/2012 | Cohen et al. |
| 8,318,443 B2 | 11/2012 | Norrild et al. |
| 8,323,250 B2 | 12/2012 | Chong et al. |
| 8,343,092 B2 | 1/2013 | Rush et al. |
| 8,352,011 B2 | 1/2013 | Van Antwerp et al. |
| 8,353,829 B2 | 1/2013 | Say et al. |
| 2007/0123819 A1 | 5/2007 | Mernoe et al. |
| 2008/0172029 A1 | 7/2008 | Blomquist |
| 2010/0160861 A1 | 6/2010 | Causey, III et al. |
| 2014/0066887 A1 | 3/2014 | Mastrototaro et al. |
| 2014/0066889 A1 | 3/2014 | Grosman et al. |
| 2018/0085532 A1 | 3/2018 | Desborough et al. |
| 2018/0089395 A1* | 3/2018 | Desborough ........ G16H 20/17 |
| 2018/0169334 A1 | 6/2018 | Grosman et al. |
| 2018/0272066 A1* | 9/2018 | McMahon ........... A61M 5/142 |
| 2019/0148024 A1* | 5/2019 | Zhong ................. A61M 5/1723 705/2 |
| 2020/0027544 A1 | 1/2020 | Booth et al. |
| 2020/0098464 A1 | 3/2020 | Velado et al. |
| 2021/0393876 A1 | 12/2021 | Roy et al. |
| 2022/0172816 A1* | 6/2022 | Mensinger ........... G16H 20/17 |
| 2022/0215930 A1* | 7/2022 | Eshel .................. G16H 20/17 |

OTHER PUBLICATIONS

U.S. Final Office Action dated Jun. 24, 2024 in U.S. Appl. No. 17/336,885.
U.S. Non-Final Office Action dated Dec. 15, 2023 in U.S. Appl. No. 17/336,885.
U.S. Restriction requirement dated May 4, 2023 in U.S. Appl. No. 17/336,885.
U.S. Advisory Action dated Sep. 9, 2024 in U.S. Appl. No. 17/336,885.
U.S. Non-Final Office Action dated Apr. 28, 2025 in U.S. Appl. No. 17/336,885.
EP Office Action dated Sep. 25, 2025 in EP Application No. 21736903.2.

* cited by examiner

DEFAULT CARBOHYDRATE CONSUMPTION COUNTS BASED ON POPULATION CARBOHYDRATE CONSUMPTION MODELS

CROSS-REFERENCE TO RELATED APPLICATIONS

The present application claims the benefit of and priority to U.S. Provisional Application No. 63/041,633, filed on Jun. 19, 2020, which is hereby incorporated by reference herein in its entirety.

TECHNICAL FIELD

The present disclosure relates generally to carbohydrate consumption, and more particularly, to default carbohydrate consumption counts.

BACKGROUND

A person may use insulin therapy to manage type I or type II diabetes. Insulin therapy may include use of insulin infusion systems for delivering or dispensing insulin. An insulin infusion system may include an infusion device which typically includes a small motor and drive train components configured to deliver insulin from a reservoir into the body of a person, e.g., via a percutaneous needle or a cannula placed in the subcutaneous tissue. Insulin infusion systems may facilitate management of diabetes for some persons.

SUMMARY

The present disclosure relates to default carbohydrate consumption counts based on population carbohydrate consumption models. Aspects of the present disclosure relate to receiving, from a device, at least one characteristic of a person; accessing a population carbohydrate consumption model which relates the at least one characteristic with carbohydrate intake for a population; determining, based on applying the population carbohydrate consumption model to the at least one characteristic, at least one of: a preliminary carbohydrate count for the person or a default carbohydrate consumption count for the person; and causing delivery of insulin to the person based on communicating, to the device, at least one of: the preliminary carbohydrate count for the person or the default carbohydrate consumption count for the person.

BRIEF DESCRIPTION OF THE DRAWINGS

The above and other aspects and features of the disclosure will become more apparent in view of the following detailed description when taken in conjunction with the accompanying drawings wherein like reference numerals identify similar or identical elements.

DETAILED DESCRIPTION

Figure 1:
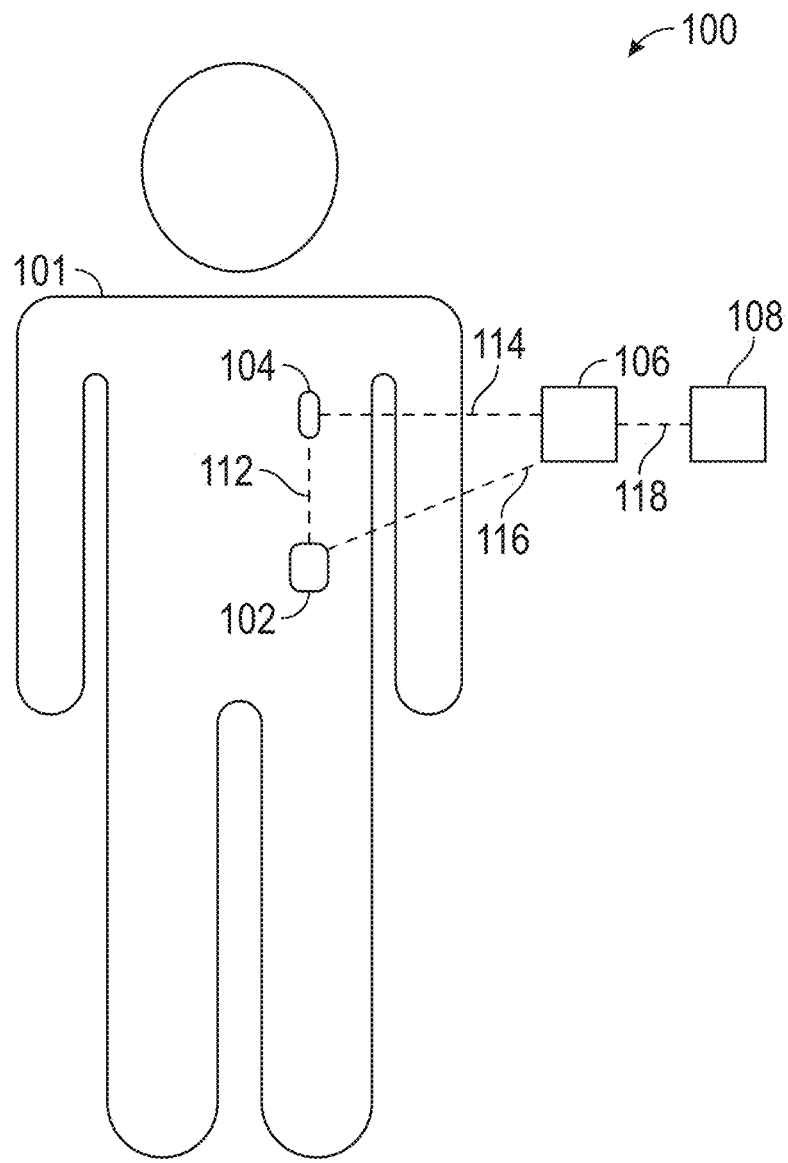
FIG. 1 is a diagram of an exemplary therapy delivery system, in accordance with aspects of the present disclosure.

The present disclosure relates to default carbohydrate consumption counts. A default carbohydrate consumption count may be utilized instead of a manual carbohydrate count to determine an amount of insulin (e.g., a meal bolus) to deliver to a person (e.g., a patient or a user) for managing a glucose level increase related to meal consumption.

Manual carbohydrate counts are typically used to determine an amount of insulin for delivery. In general, this involves the tedious and error-prone process of estimating how many carbohydrates are included in each meal. However, missing or inaccurate estimates can have undesirable consequences, such as insulin under-delivery/over-delivery.

To avoid the aforementioned shortcomings, disclosed herein are techniques related to determining default carbohydrate counts that can be used instead of manual carbohydrate counts. A default carbohydrate consumption count may be a uniform amount of carbohydrates that can be used for each meal. Uniformity may be achieved based on using a safe and low value for the default carbohydrate consumption count. Thus, any resulting under-delivery of insulin can be corrected based on one or more supplemental insulin deliveries (e.g., using closed-loop control).

Additionally, or alternatively, a default carbohydrate consumption count may be specific to one or more characteristics (e.g., age and/or body weight) of a person. For example, the age and body weight of a patient may be provided as input to a population-based model for determining a median carbohydrate count corresponding to any persons of the age and body weight. To achieve the aforementioned uniformity, the median carbohydrate count may be treated as a preliminary carbohydrate count that is reduced to obtain the default carbohydrate consumption count. For instance, a scaling factor (e.g., a percentage) may be applied to the median carbohydrate count to derive the default carbohydrate consumption count.

For various reasons (including safety), further processing may be performed on the default carbohydrate consumption count. For example, a lower limit (e.g., a minimum value) and/or an upper limit (e.g., a maximum value) may be applied to the default carbohydrate consumption count so that it can be converted into an insulin delivery amount that does not violate minimum and/or maximum delivery thresholds.

The present disclosure is described primarily with respect to insulin delivery systems. Aspects and embodiments of the present disclosure can be practiced with one or more types of insulin (e.g., fast-acting insulin, intermediate-acting insulin, and/or slow-acting insulin). Unless indicated by the context, terms such as "dose," "insulin," "basal," and "bolus" may not denote a particular type of insulin. For example, fast-acting insulin may be used for both basal dosages and bolus dosages. As used herein, the term "basal" refers to and includes insulin that is delivered in an amount and at a frequency that is intended to correspond to a healthy body's release of insulin between meals and during sleep. The term "bolus" refers to and includes insulin that is delivered in an amount and at a timing that is intended to correspond to a healthy body's release of insulin for counteracting a high glucose level, such as that caused by consumption of a meal. A meal may include any type or amount of food or beverage consumption, including breakfast, lunch, dinner, snacks, and beverages, among others.

Although the present disclosure may be described primarily with respect to insulin delivery systems, the scope of the present disclosure is not limited to insulin delivery systems. Rather, the present disclosure applies to and can be implemented for other therapy systems as well. It is intended that any aspects, embodiment, and description relating to insulin delivery systems shall be applicable to other types of therapy delivery systems as well.

Although the disclosure is not limited in this regard, discussions utilizing terms such as, for example, "processing," "computing," "calculating," "determining," "establishing," "analyzing," "checking," or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other non-transitory information storage media that may store instructions to perform operations and/or processes. As used herein, "exemplary" does not necessarily mean "preferred" and may simply refer to an example unless the context clearly indicates otherwise. Although the disclosure is not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items. Unless explicitly stated, the methods described herein are not constrained to a particular order or sequence. Additionally, some of the described methods or elements thereof can occur or be performed simultaneously, at the same point in time, or concurrently.

Referring to FIG. 1, there is shown a diagram of an exemplary therapy delivery system 100 for a person 101. System 100 may be an insulin delivery system. The illustrated therapy delivery system 100 includes a delivery device 102, a monitoring device 104, a computing device 106, and an optional remote or cloud computing system 108. The delivery device 102, the monitoring device 104, and the computing device 106 may be embodied in various ways, including being disposed in one or more device housings. For example, in various embodiments, all of the devices 102-106 may be disposed in a single device housing. In various embodiments, each of the devices 102-106 may be disposed in a separate device housing. In various embodiments, two or more of the devices 102-106 may be disposed in the same device housing, and/or a single device 102, 104, or 106 may have two or more parts that are disposed in two or more housings. Such embodiments, and combinations thereof, are contemplated to be within the scope of the present disclosure.

FIG. 1 also illustrates communications links 112-118. The communications links 112-118 may each be a wired connection and/or a wireless connection. In the case where two devices are located in the same device housing, the communication link may include, for example, wires, cables, and/or communication buses on a printed circuit board, among other things. In the case where two devices are separated from each other in different device housings, the communication links may be wired and/or wireless connections. Wired connections may include, without limitation, an Ethernet connection, a USB connection, and/or another type of physical connection. Wireless connections may include, without limitation, a cellular connection, a Wi-Fi connection, a Bluetooth® connection, a mesh network connection, and/or another type of connection using a wireless communication protocol. Various embodiments of the communication links 112-118 may use direct connections, such as Bluetooth® connections, and/or may use connections that route through one or more networks or network devices (not shown), such as an Ethernet network, a Wi-Fi network, a cellular network, a satellite network, an intranet, an extranet, the Internet, and/or the Internet backbone, among other types of networks. Various combinations of wired and/or wireless connections may be used for the communication links 112-118.

Aspects of the insulin delivery system 100 are described below. Further aspects and details may be described in U.S. Pat. Nos. 4,562,751; 4,685,903; 5,080,653; 5,505,709; 5,097,122; 6,485,465; 6,554,798; 6,558,320; 6,558,351; 6,641,533; 6,659,980; 6,752,787; 6,817,990; 6,932,584; and 7,621,893. The entire contents of each of the foregoing United States Patents are hereby incorporated by reference herein.

The delivery device 102 is configured to deliver a therapeutic substance (e.g., insulin) to a person 101. The delivery device 102 may be secured to the person 101 (e.g., to the body or clothing of the person 101) or may be implanted on or in the body of the person 101. In various embodiments, the delivery device 102 may include a reservoir, an actuator, a delivery mechanism, and a cannula (not shown). The reservoir may be configured to store an amount of the therapeutic substance. In various embodiments, the reservoir may be refillable or replaceable. The actuator may be configured to drive the delivery mechanism. In some examples, the actuator may include a motor, such as an electric motor. The delivery mechanism may be configured to move the therapeutic substance from the reservoir through the cannula. In some examples, the delivery mechanism may include a pump and/or a plunger. The cannula may facilitate a fluidic connection between the reservoir and the body of the person 101. The cannula and/or a needle may facilitate delivery of the therapeutic substance to a tissue layer, vein, or body cavity of the person 101. During operation, the actuator, in response to a signal (e.g., a command signal), may drive the delivery mechanism, thereby causing the therapeutic substance to move from the reservoir, through the cannula, and into the body of the person 101.

The components of the delivery device 102 described above are exemplary. The delivery device 102 may include other components, such as, without limitation, a power supply, a communication transceiver, computing resources, and/or user interfaces, among other things. Persons skilled in the art will recognize various implementations of the delivery device 102 and the components of such implementations. All such implementations and components are contemplated to be within the scope of the present disclosure.

With continuing reference to FIG. 1, the monitoring device 104 is configured to detect a physiological condition (e.g., a glucose concentration level) of the person 101 and may also be configured to detect other things. The monitoring device 104 may be secured to the body of the person 101 (e.g., to the skin of person 101 via an adhesive) and/or may be at least partially implanted into the body of the person 101. Depending on the particular location or configuration, the monitoring device 104 may be in contact with biological matter (e.g., interstitial fluid and/or blood) of the person 101.

The monitoring device 104 includes one or more sensors (not shown), such as, without limitation, electrochemical sensors, electrical sensors, and/or optical sensors. As persons skilled in the art will understand, an electrochemical sensor may be configured to respond to the interaction or binding of a biological marker to a substrate by generating an electrical signal based on a potential, conductance, and/or impedance of the substrate. The substrate may include a material selected to interact with a particular biomarker, such as glucose. The potential, conductance, and/or impedance may be proportional to a concentration of the particular biomarker. In the case of electrical sensors, and as persons skilled in the art will understand, an electrical sensor may be configured to respond to an electrical biosignal by generating an electrical signal based on an amplitude, frequency, and/or phase of the electrical biosignal. The electrical biosignal may include a change in electric current produced by the sum of an electrical potential difference across a tissue, such as the nervous system, of the person 101. In various embodiments, the electrical biosignal may include portions of a potential change produced by the heart of the person 101 over time, e.g., recorded as an electrocardiogram, that are indicative of a glucose level of the person 101. In the case of optical sensors, as persons skilled in the art will understand, an optical sensor may be configured to respond to the interaction or binding of a biological marker to a substrate by generating an electrical signal based on change in luminance of the substrate. For example, the substrate may include a material selected to fluoresce in response to contact with a selected biomarker, such as glucose. The fluorescence may be proportional to a concentration of the selected biomarker.

In various embodiments, the monitoring device 104 may include other types of sensors that may be worn, carried, or coupled to the person 101 to measure activity of the person 101 that may influence the glucose levels or glycemic response of the person 101. As an example, the sensors may include an acceleration sensor configured to detect an acceleration of the person 101 or a portion of the person 101, such as the person's hands or feet. The acceleration (or lack thereof) may be indicative of exercise, sleep, or food/beverage consumption activity of the person 101, which may influence the glycemic response of the person 101. In various embodiments, the sensors may include heart rate and/or body temperature, which may indicate an amount of physical exertion experienced by the person 101. In various embodiments, the sensors may include a GPS receiver which detects GPS signals to determine a location of the person 101.

The sensors described above are exemplary. Other sensors or types of sensors for monitoring physiological condition, activity, and/or location, among other things, will be recognized by persons skilled in the art and are contemplated to be within the scope of the present disclosure. For any sensor, the signal provided by a sensor shall be referred to as a "sensor signal."

The monitoring device 104 may include components and/or circuitry configured to preprocess sensor signals. Preprocessing may include, without limitation, amplification, filtering, attenuation, scaling, isolation, normalization, transformation, sampling, and/or analog-to-digital conversion, among other things. Persons skilled in the art will recognize various implementations for such preprocessing, including, without limitation, implementations using processors, controllers, ASICS, integrated circuits, hardware, firmware, programmable logic devices, and/or machine-executable instructions, among others. The types of preprocessing and their implementations are exemplary. Other types of preprocessing and implementations are contemplated to be within the scope of the present disclosure. In various embodiments, the monitoring device 104 may not perform preprocessing.

As used herein, the term "sensed data" shall mean and include the information represented by a sensor signal or by a preprocessed sensor signal. In various embodiments, sensed data may include glucose levels in a person 101, acceleration of a part of the person 101, heart rate and temperature of the person 101, and/or GPS location of the person 101, among other things. The monitoring device 104 may communicate sensed data to the delivery device 102 via communication link 112 and/or to the computing device 106 via communication link 114. Use of sensed data by the delivery device 102 and/or by the computing device 106 will be described later herein.

The computing device 106 provides processing capabilities and may be implemented in various ways. In various embodiments, the computing device 106 may be a consumer device, such as a smartphone, a computerized wearable device (e.g., a smartwatch), a tablet computer, a laptop computer, or a desktop computer, among others, or may be a special purpose device (e.g., a portable control device) provided by, for example, the manufacturer of the delivery device 102. In various embodiments, the computing device 106 may be "processing circuitry" (defined below) that is integrated with another device, such as the delivery device 102. In various embodiments, the computing device 106 may be secured to the person 101 (e.g., to the body or clothing of person 101), may be at least partially implanted into the body of person 101, and/or may be held by the person 101.

For each of the embodiments of the computing device 106, the computing device 106 may include various types of logic circuitry, including, but not limited to, microprocessors, controllers, digital signal processors (DSPs), application specific integrated circuits (ASICs), field-programmable gate arrays (FPGAs), central processing units (CPU), graphics processing units (GPU), programmable logic devices, memory (e.g., random access memory, volatile memory, non-volatile memory, etc.), or other discrete or integrated logic circuitry, as well as combinations of such components. The term "processing circuitry" may generally refer to any of the foregoing logic circuitry, alone or in combination with other logic circuitry, or any other circuitry for performing computations.

Aspects of the delivery device 102, the monitoring device 104, and the computing device 106 have been described above. One or more of the devices 102-106 may include a user interface (not shown) that presents information to the person 101 and/or receives information from the person 101. The user interface may include a graphical user interface (GUI), a display device, a keyboard, a touchscreen, a speaker, a microphone, a vibration motor, buttons, switches, and/or other types of user interfaces. Persons skilled in the art will recognize various types of user interfaces that may be used, and all such user interfaces are contemplated to be within the scope of the present disclosure. For example, where the computing device 106 is a consumer device such as a smart phone, tablet computer, laptop computer, or the like, the user interfaces would include a display device, a physical and/or virtual keyboard, and/or audio speakers provided by such consumer devices, among other things. In various embodiments, a user interface may notify the person 101 of sensed data (e.g., glucose level) and/or insulin delivery data (e.g., rates of historic, current, or future insulin delivery) and may present alerts to the person 101. In various embodiments, a user interface may receive inputs from the person 101, which may include, for example, a requested change in insulin delivery and/or a meal indication, among other things. The descriptions and embodiments above regarding user interfaces are exemplary, and other types and other uses of user interfaces are contemplated to be within the scope of the present disclosure.

The following describes communications between the devices 102-106 and cooperation between the devices 102-106 with respect to insulin delivery. As illustrated in FIG. 1, and as mentioned above, the devices 102-106 may communicate with each other via communication links 112-116. In various embodiments, the computing device 106 may control operation of the delivery device 102 and/or the monitoring device 104. For example, the computing device 106 may generate one or more signals (e.g., a command signal) that cause the delivery device 102 to deliver insulin to the person 101, e.g., as a basal dosage and/or a bolus dosage. In various embodiments, the computing device 106 may receive data associated with insulin delivery (e.g., insulin delivery data) from the delivery device 102 and/or receive sensed data (e.g., glucose levels) from the monitoring device 104 and may perform computations based on the insulin delivery data, the sensed data, and/or other data to control the delivery device 102. Insulin delivery data may include, but is not limited to, a type of insulin being delivered, historical insulin delivery rates and/or amounts, current insulin delivery rate and/or amount, and/or user input affecting insulin delivery. As persons skilled in the art will understand, in a closed-loop operating mode, computing device 106 may communicate dosage commands to the delivery device 102 based on a difference between a current glucose level in the body of the person 101 (e.g., received from the monitoring device 104) and a target glucose level (e.g., determined by the computing device 106). The dosage commands may indicate an amount of insulin to be delivered and/or a rate of insulin delivery and may regulate the current glucose level toward the target glucose level. Examples of closed-loop operations for insulin infusion systems are described in U.S. Pat. Nos. 6,088,608, 6,119,028, 6,589,229, 6,740,072, 6,827,702, 7,323,142, and 7,402,153, and in United States Patent Application Publication Nos.: 2014/0066887 and 2014/0066889. The entire contents of each of the foregoing patents and publications are hereby incorporated by reference herein.

In accordance with aspects of the present disclosure, the delivery device 102, the monitoring device 104, and/or the computing device 106 may store a default carbohydrate consumption count. As persons skilled in the art will understand, a person typically estimates the grams of carbohydrates he/she consumes and provides this count to his/her insulin delivery system so that a proper amount of insulin may be delivered to the person. The default carbohydrate consumption count of the present disclosure may be used to replace manual carbohydrate counting or to provide an alternative to manual carbohydrate counting. The systems and approaches for determining a default carbohydrate consumption count will be described later herein. For now, it is sufficient to note that the default carbohydrate consumption count may be determined by the computing device 106 and/or by the remote or cloud computing system 108 and may be communicated to and stored by the delivery device 102, the monitoring device 104, and/or the computing device 106. In various embodiments, the default carbohydrate consumption count may be used by the delivery device 102, the monitoring device 104, and/or the computing device 106 when a food/beverage consumption indication is received or detected. For example, the delivery device 102 may deliver an appropriate amount of insulin based on the default carbohydrate consumption count rather than based on a manual carbohydrate count. Aspects and approaches for determining and using a default carbohydrate consumption count will be described in more detail later herein.

With continuing reference to FIG. 1, the remote or cloud computing system 108 may be a proprietary remote/cloud computing system or a commercial cloud computing system. The remote/cloud computing system 108 may provide additional computing resources on-demand as needed when the computing resources of the computing device 106 are not sufficient. The computing device 106 and the remote/cloud computing system 108 may communicate with each other through a communication link 118, which may traverse one or more communication networks (not shown). The communication networks may include, with limitation, an Ethernet network, Wi-Fi network, a cellular network, a satellite network, an intranet, an extranet, the Internet, and/or the Internet backbone, among other types of networks. Persons skilled in the art will recognize implementations for the remote/cloud computing system 108 and how to interface with such systems through various types of networks. For example, the remote/cloud computing system 108 may include an array of processing circuitry (defined above) and may execute machine-readable instructions. Such implementations, interfaces, and networks are contemplated to be within the scope of the present disclosure.

Accordingly, an exemplary therapy delivery system has been described above. For convenience, the description below may primarily refer to an insulin delivery system as an example of the therapy delivery system. However, it is intended that any aspect, embodiment, or description relating to an insulin delivery system shall be applicable to a therapy delivery system which delivers a therapy other than insulin.

Figure 2:
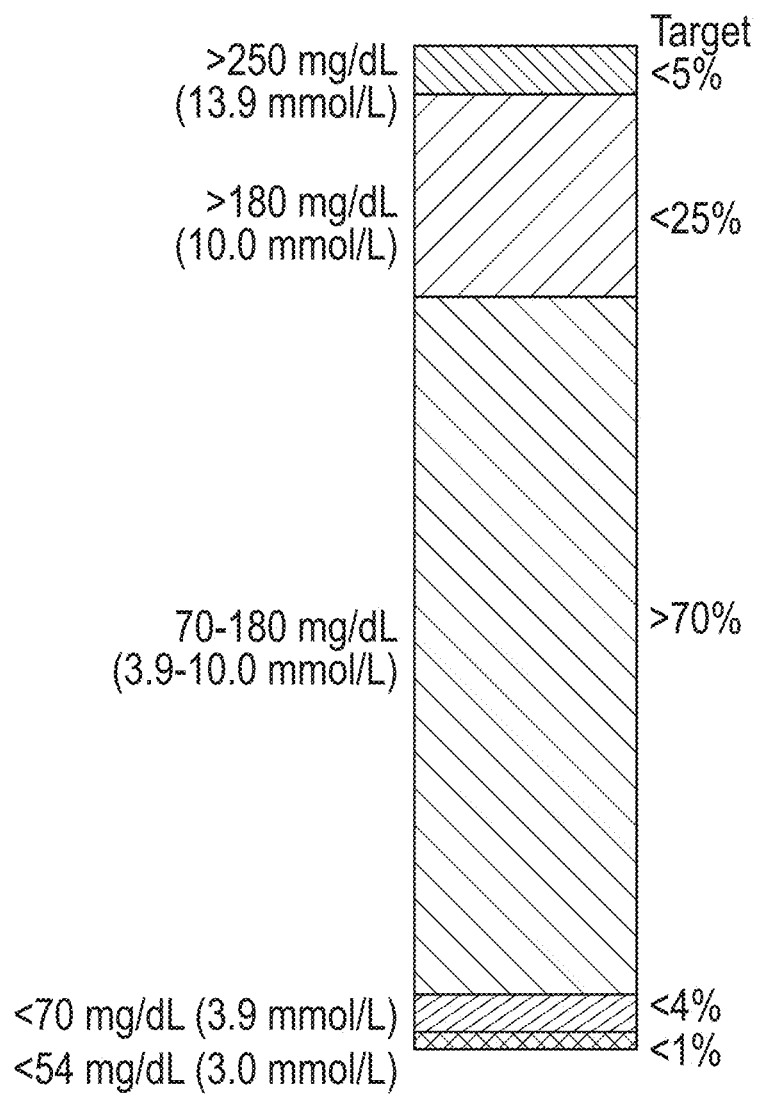
FIG. 2 is a diagram of an exemplary glucose management goal that includes a desired glucose range, in accordance with aspects of the present disclosure.

Referring now to FIG. 2, there is shown a diagram of a range of bodily glucose levels expressed in units of milligrams per deciliter (mg/dL) and in units of millimoles per liter (mmol/L). FIG. 2 also shows target percentages of time in which a person's glucose levels should remain within the illustrated ranges. In particular, the exemplary diagram reflects a target of bodily glucose levels being between 70-180 mg/dL for at least 70% of the time, above 180 mg/dL for at most 25% of the time, above 250 mg/dL for at most 5% of the time, below 70 mg/dL for at most 4% of the time, and below 54 mg/dL for at most 1% of the time. The percentage thresholds of FIG. 2 do not sum to 100% because a person's bodily glucose levels may not enter into or remain in every range. The time frame for the percentages may vary and may be one day, less than one day, or more than one day.

The diagram of FIG. 2 reflects a glucose management goal of maintaining bodily glucose levels for as long as possible between 70-180 mg/dL and for at least 70% of the time. In the illustrated embodiment, the range 70-180 mg/dL will be referred to as a "desired range." The term "time-in-range" may be used herein to refer to the amount of time or percentage of time that a person's glucose level remains in a desired range over a particular time frame. The time frame may vary and may be one day, less than one day, or more than one day. Insulin delivery systems, such as the therapy delivery system of FIG. 1, may be configured to achieve or exceed a particular time-in-range for a person. The diagram of FIG. 2 is exemplary and other glucose management goals are contemplated to be within the scope of the present disclosure.

Figure 3:
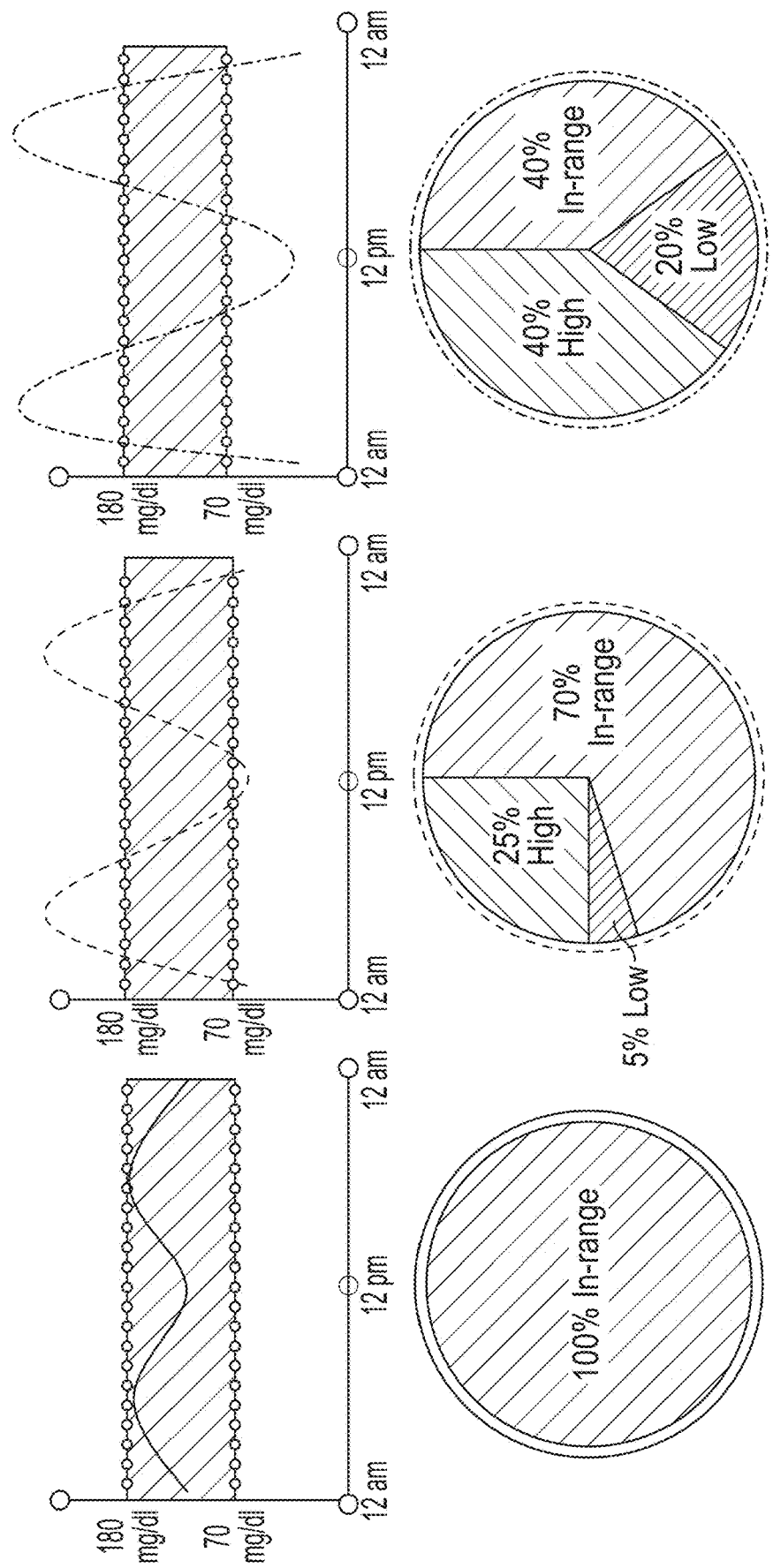
FIG. 3 is a diagram of exemplary glucose level scenarios each of which corresponds to a different time-in-range, in accordance with aspects of the present disclosure.

FIG. 3 is a diagram illustrating three scenarios, for explanatory purposes only, which show bodily glucose levels over a single day and show different percentages of time-in-range, for the glucose management goal of FIG. 2. When a person consumes carbohydrates, the amount of insulin delivered to the person by an insulin delivery device should increase and should correspond to the amount and timing of carbohydrates consumed. While a healthy body provides a natural response to carbohydrate intake by providing appropriate amounts of insulin at appropriate times, an insulin delivery system, such as the therapy delivery system of FIG. 1, largely relies on estimates, sensor data, person-specific parameters (e.g., insulin-to-carb ratio), and/or algorithms to determine the amount of insulin to deliver to the person and the appropriate time to deliver the insulin. The far-right scenario of FIG. 3 shows only 40% time-in-range and may occur for a person for various reasons, including, for example, an insulin delivery system having inaccurate or untimely information about carbohydrate intake.

As persons skilled in the art understand, carbohydrate counting or "carb counting" refers to a person's estimate of grams of carbohydrates consumed. Unless food consumption is rigorously planned and structured in advance, carb counting may be time consuming and inaccurate, even with the assistance of carb counting apps. For example, carb counting within +/−30 gm of actual carbohydrate consumption may be accurately estimated only about 50% of the time among the adolescent population who use continuous subcutaneous insulin infusion systems. And even more concerning, the average frequency of missed mealtime bolus for the pediatric population may be as high as 1.5 to 2 times per week.

Aspects of the present disclosure provide a replacement for or an alternative to carb counting by providing a default carbohydrate consumption count. As described below, the systems and methods of the present disclosure may determine a default carbohydrate consumption count for a person based on a population carbohydrate consumption model and based on the person's demographic characteristics and personal characteristics, among other things. In various embodiments, a default carbohydrate consumption count for a person may be configured such that using it in place of manual carb counting may still achieve a desired time-in-range.

Figure 4:
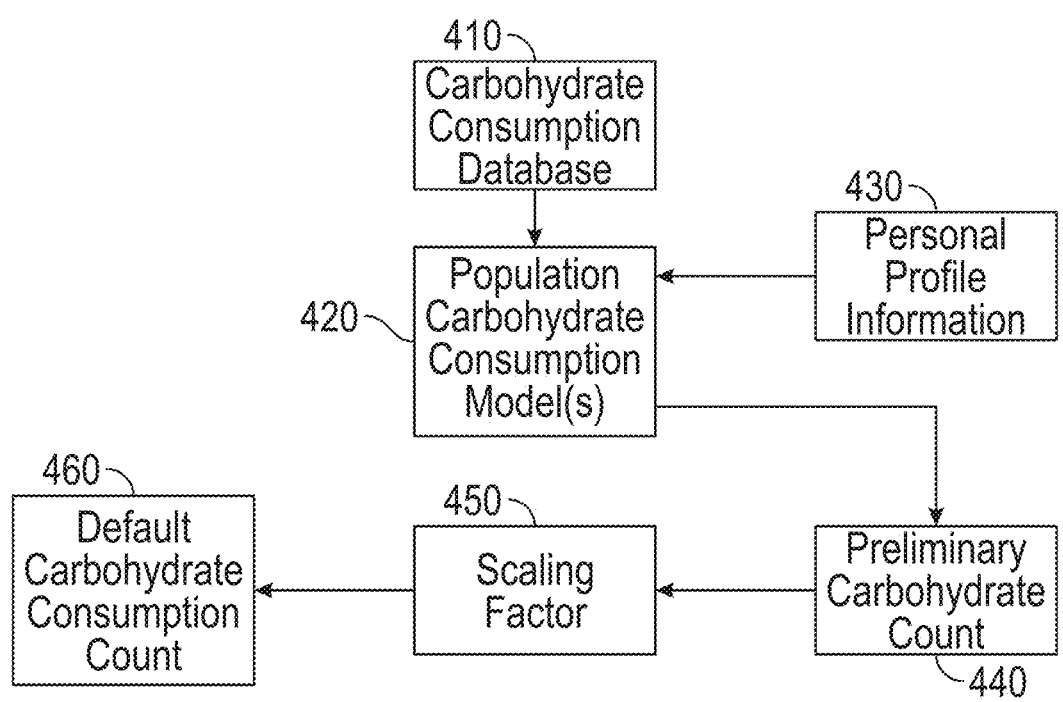
FIG. 4 is a block diagram of exemplary components of a system for providing a default carbohydrate consumption count, in accordance with aspects of the present disclosure.

FIG. 4 shows a block diagram of exemplary data and components of a system for providing a default carbohydrate consumption count. The illustrated data and components include a carbohydrate consumption database 410, one or more population carbohydrate consumption models 420, and personal profile information 430. Data in the carbohydrate consumption database 410 is used to generate the population carbohydrate consumption model(s) 420, which are applied to personal profile information 430 for a person to generate a preliminary carbohydrate count 440 for the person. The preliminary carbohydrate count 440 is scaled by a scaling factor 450 to provide a default carbohydrate consumption count 460 for the person. These components are described in more detail below.

In accordance with aspects of the present disclosure, the carbohydrate consumption database 410 includes carbohydrate counts and personal information for a population of people. In various embodiments, the personal information may include demographic characteristics, location characteristics, activity characteristics, and/or other characteristics. In various embodiments, the population covered by the database 410 may be specific to a particular region and/or demographic, such that different databases are utilized to cover different regions and/or demographics. In various embodiments, the population covered by the database 410 may broadly cover different regions and/or demographics, such that the database can be queried to capture different regions and/or demographics.

Generally, the carbohydrate consumption database 410 can include carbohydrate counts performed by individuals. The data may be captured in various ways. In accordance with aspects of the present disclosure, and referring also to FIG. 1, a person 101 using the therapy delivery system 100 may establish a personal profile containing personal information, which may be stored in any of the devices 102-106 and/or in the remote/cloud computing system 108. The personal profile may include demographic characteristics, location characteristics, activity characteristics, and/or other characteristics. For example, the characteristics stored in a personal profile may include, without limitation, age, body weight, gender, nationality, ethnicity, occupation, location (e.g., city, county, state, zip code, country), and/or frequency of exercise, among other things. Whenever the person 101 performs carb counting in connection with food consumption, the person 101 can manually enter the carbohydrate count via a user interface of one of the devices 102-106. The carbohydrate count can be associated with the personal profile of the person 101 and can be stored with a time and/or date stamp as a carbohydrate count entry in any of the devices 102-106. In various embodiments, sensor data captured by the monitoring device 104 at or around the time of the carbohydrate count entry may also be stored in or associated with the carbohydrate count entry. As described in connection with FIG. 1, the monitoring device 104 and/or the computing device 106 may include a GPS receiver which detects GPS signals to determine location. The GPS location may be stored in a carbohydrate count entry if it is available.

The carbohydrate count may be used by the computing device 106 and/or the delivery device 102 to control insulin delivery to the person 101 or for other purposes. Additionally, the carbohydrate count entry may be automatically uploaded to a database, such as the carbohydrate consumption database 410 of FIG. 4, which may reside in the remote/cloud computing system 108. The database 410 can be used to generate reports of the person's carbohydrate consumption over time and provide helpful statistics to aid the person's future carb counting. Additionally, in accordance with aspects of the present disclosure, the carbohydrate count entries in the database 410 may be aggregated for a population. In this manner, the carbohydrate consumption database 410 may be formed by "crowdsourcing" carbohydrate count entries over time. Other manners of capturing carbohydrate counts and personal information are contemplated. For example, persons may manually enter or upload carbohydrate count entries and personal information to the database 410 via an online portal, or third-party databases from glycemic studies may provide carbohydrate consumption entries, among others. Such and other embodiments are contemplated to be within the scope of the present disclosure.

For simplicity, the carbohydrate counts stored in the database 410 may be referred to herein as "carbohydrate intake." With continuing reference to FIG. 4, data stored in the carbohydrate consumption database 410 is used to create one or more population carbohydrate consumption model(s) 420 which model relationships between carbohydrate intake and one or more population characteristics. The population characteristics available for modeling depend on what is available in the database 410. As mentioned above, characteristics stored in the carbohydrate count entries may include, without limitation, age, body weight, gender, nationality, ethnicity, occupation, location (e.g., city, county, state, zip code, country), and/or frequency of exercise, among other things. If available, such information in the database 410 may be used to generate the population carbohydrate consumption models 420.

Figure 5:
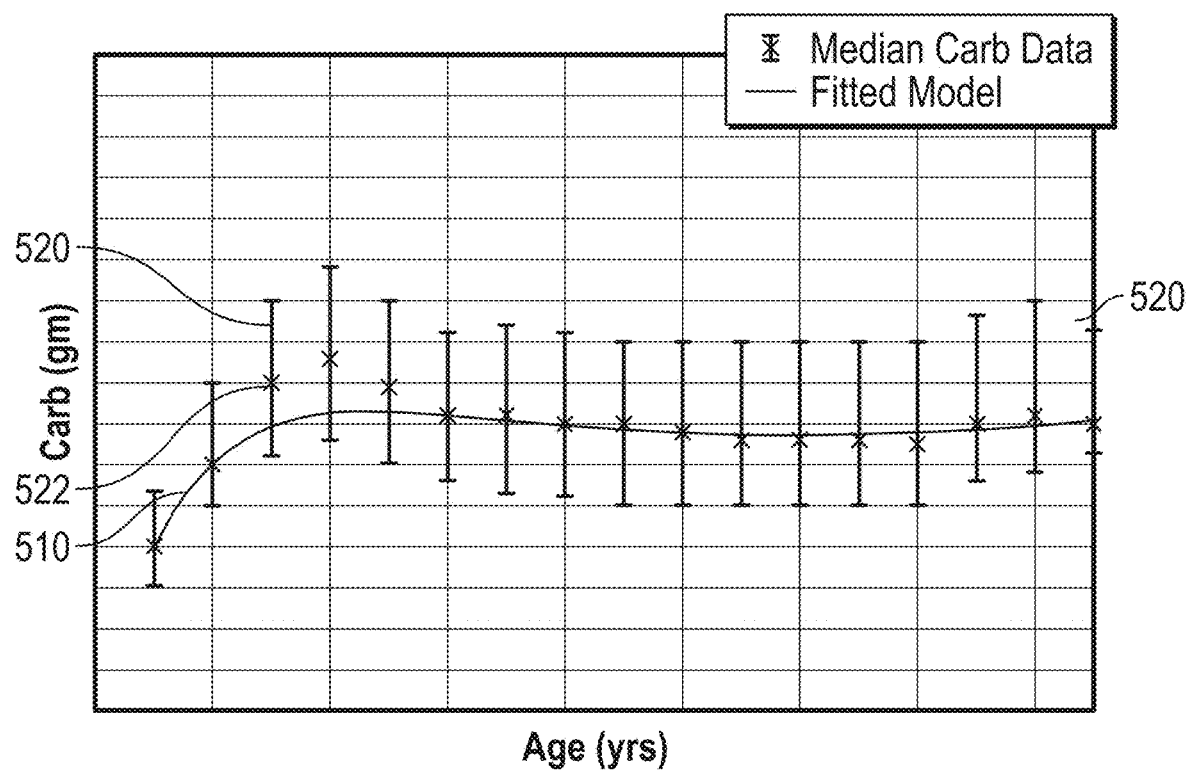
FIG. 5 is a diagram of an exemplary population carbohydrate consumption model which relates age to carbohydrate intake for a population, in accordance with aspects of the present disclosure.
Figure 6:
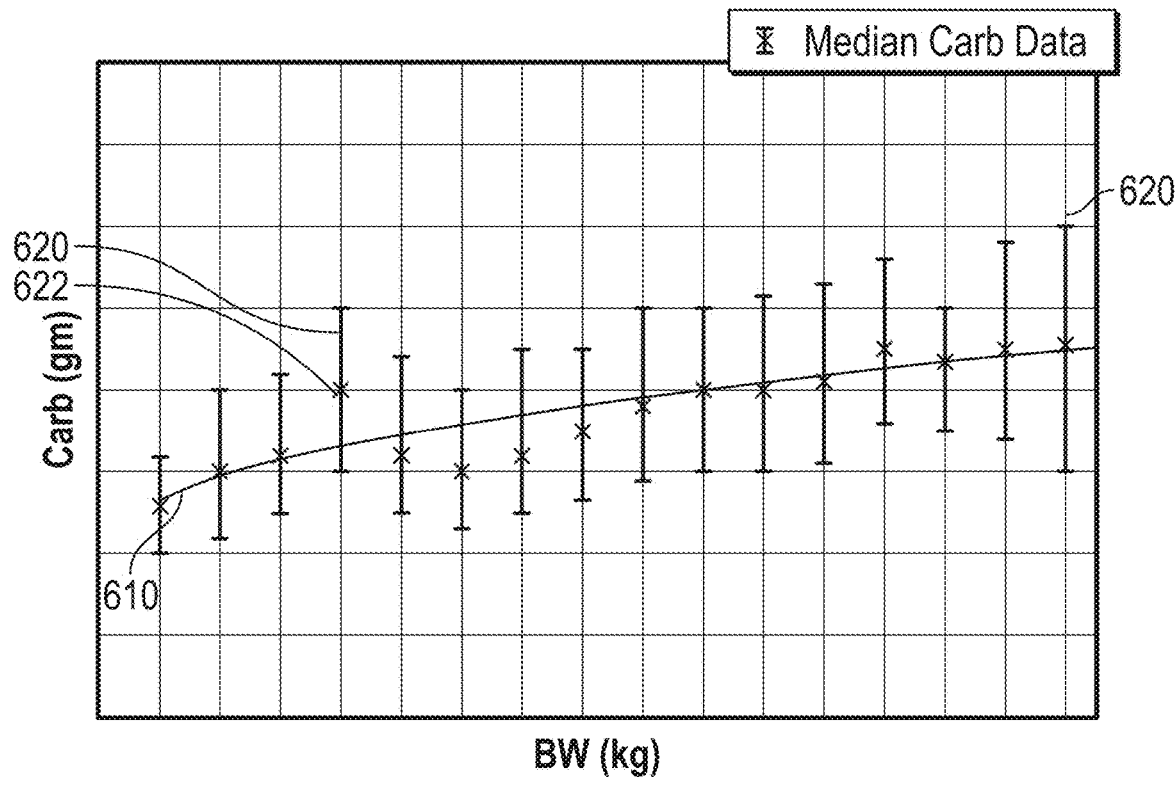
FIG. 6 is a diagram of an exemplary population carbohydrate consumption model which relates body weight to carbohydrate intake for a population, in accordance with aspects of the present disclosure.
Figure 7:
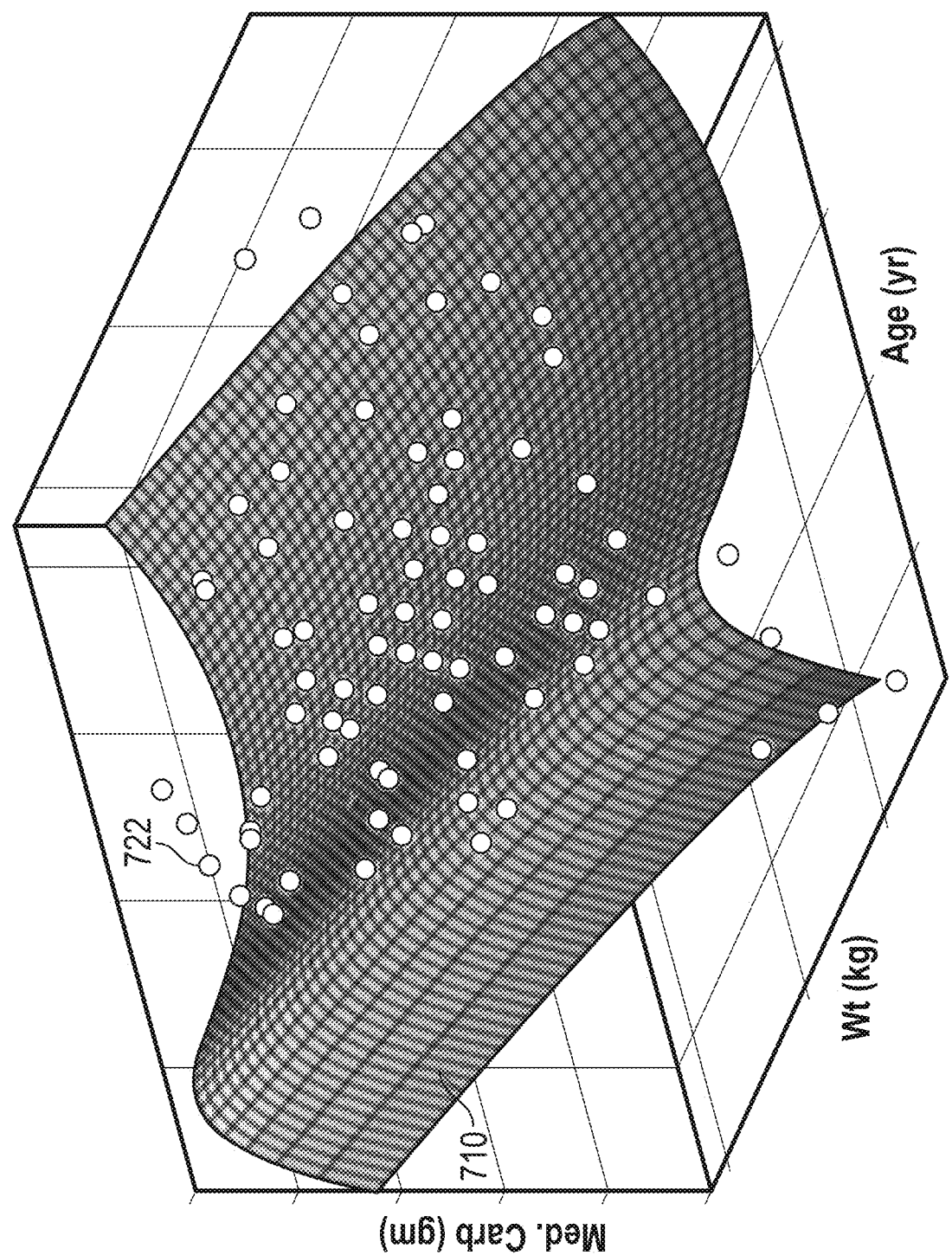
FIG. 7 is a diagram of an exemplary population carbohydrate consumption model which relates age and body weight to carbohydrate intake for a population, in accordance with aspects of the present disclosure.

Examples of the carbohydrate consumption models 420 are shown in FIGS. 5-7. FIG. 5 shows an exemplary model which relates age to carbohydrate intake for a population, FIG. 6 shows an exemplary model which relates body weight to carbohydrate intake for a population, and FIG. 7 shows an exemplary model which relates both age and body weight to carbohydrate intake for a population. Each of these models and the techniques for generating the models are described later herein. The carbohydrate consumption models 420 may include any number of models. A model may relate a single characteristic to carbohydrate intake for a population or may relate multiple characteristics to carbohydrate intake for a population. In various embodiments, the models may be generated by a cloud computing system, such as the remote/cloud computing system 108 of FIG. 1. The techniques for generating the models are described later herein. In various embodiments, models which are more computationally intensive to generate and/or use may be maintained at a cloud computing system or at a server and may be accessed by one or more device(s) (e.g., 102-106, FIG. 1) over a network. Models which are less computationally intensive to generate and/or use may be maintained in the person's devices (e.g., 102-106, FIG. 1) for local access by the person's devices.

In accordance with aspects of the present disclosure, a particular carbohydrate consumption model 420 may be accessed and utilized for a person based on personal profile information 430 for the person. The personal profile information 430 for a person may be stored in one or more of the person's devices (e.g., 102-106, FIG. 1). As mentioned above, personal profile information 430 may include demographic characteristics, location characteristics, activity characteristics, and/or other characteristics. Examples of personal profile information include, without limitation, age, body weight, gender, nationality, ethnicity, occupation, location (e.g., city, county, state, zip code, country), and/or frequency of exercise, among other things. Available characteristics in a person's personal profile information 430 may be matched to available population carbohydrate consumption models 420 to select a particular model to apply to the person. For example, if only age is available in the personal profile information 430, the model of FIG. 5 may be selected. If only body weight is available in the personal profile information 430, the model of FIG. 6 may be selected. If both age and body weight are available in the personal profile information 430, the model of FIG. 7 may be selected. The models of FIGS. 5-7 are exemplary, and other models may be selected based on their availability.

The selected population carbohydrate consumption model 420 may be utilized to provide a preliminary carbohydrate count 440 for the person. In various embodiments, the preliminary carbohydrate count 440 may be a median carbohydrate count, which will be explained in more detail below in connection with FIGS. 5-7. Because the preliminary carbohydrate count 440 is derived from a population-based model 420, the preliminary carbohydrate count 440 may be adjusted for a particular person in order for the value to be used in place of actual carbohydrate counting and in order for the person's bodily glucose levels to achieve a desired time-in-range (such as the desired time-in-range shown in FIG. 2).

In accordance with aspects of the present disclosure, the preliminary carbohydrate count 440 may be adjusted using a scaling factor 450 to provide a default carbohydrate consumption count 460 as:

default carbohydrate consumption count=(scaling factor)* (preliminary carbohydrate count), with the default carbohydrate consumption count being bounded by lower and upper limits. In various embodiments, the scaling factor is set to a value less than one to avoid hypoglycemia in case the default carbohydrate consumption count is used in place of carbohydrate counting for every meal, such as in place of small snacks. In any case, if the default carbohydrate consumption count is less than a predetermined lower limit, the default carbohydrate consumption count can be set to the value of the lower limit. And if the default carbohydrate consumption count is greater than a predetermined upper limit, the default carbohydrate consumption count can be set to the value of the upper limit.

In accordance with aspects of the present disclosure, the scaling factor 450 for a person may be set to an initial value (e.g., 0.5 or another value) and may be adjusted/optimized over time, based on the person's glycemic response, to maximize time-in-range. In particular, when the person uses the default carbohydrate consumption count in place of actual carb counting, the person's bodily glucose level may exhibit different outcomes, such as the different scenarios shown in FIG. 3. By adjusting the scaling factor 450 based on a person's glycemic response, the default carbohydrate consumption count may be optimized for maximum time-in-range.

In various embodiments, the scaling factor 450 may be determined based on simulations of glycemic responses in simulated persons. Persons skilled in the art will recognize various simulators which may be used to simulate glycemic responses. In various embodiments, a large number of different simulations may be run using different scaling factors. The scaling factor value that yields the maximum amount of time within a desired glucose range, without causing unacceptable hypoglycemia or hyperglycemia, may be selected as the optimal scaling factor.

In various embodiments, the initial value of the scaling factor 450 for any person may be set based on simulations, and the scaling factor 450 can be adjusted over time based on the person's glycemic response over time. Other ways of setting and adjusting the scaling factor 450 are contemplated to be within the scope of the present disclosure.

Additionally, or alternatively, a desired glucose level may be achieved based on using closed-loop control in conjunction with delivery of an initial amount of insulin that is determined based on the default carbohydrate consumption count. For example, closed-loop control may involve device 102 and/or device 106 obtaining, from device 104, sensor data indicative of a glycemic response to the delivery of the initial amount of insulin and utilizing the sensor data to determine an additional amount of insulin for delivery. Examples of closed-loop control algorithms include a proportional-integral-derivative (PID) control algorithm and a model predictive control (MPC) algorithm.

The default carbohydrate consumption count 460 for the person may be stored in the personal profile information 430 and/or may be stored in the person's devices (e.g., 102-106, FIG. 1) for use by the devices to control insulin delivery or for other purposes. For example, any insulin control system or algorithm which uses a carbohydrate count may, instead, use the default carbohydrate consumption count 460 for the person in controlling insulin delivery to the person.

Referring now to FIG. 5, FIG. 5 shows a population carbohydrate consumption model 510 which relates age to carbohydrate intake for a population. In the illustrated embodiment, the carbohydrate consumption model 510 is a fitted curve which is fitted to carbohydrate count data 520 across age groups for a population. For clarity, not all of the carbohydrate count data in FIG. 5 are labelled with numeral 520. The age range covered by the carbohydrate consumption model 510 may vary. For example, the age range covered by the carbohydrate consumption model 510 may be limited to adolescents or may be limited to adults, or the age range covered by the carbohydrate consumption model 510 may cover both adolescents and adults. A carbohydrate consumption model 510 which is age-range limited may provide a more accurate model where sufficient data is available, whereas a carbohydrate consumption model 510 which covers a wider age range may compensate for sparse data in certain age groups. In the illustrated embodiment, the fitted curve of the carbohydrate consumption model 510 is fitted using the median carbohydrate counts of each age group, which are indicated by markers 522. Fitting to median carbohydrate counts is exemplary, and fitting to other metrics (e.g., mean carbohydrate counts) is contemplated to be within the scope of the present disclosure.

In various embodiments, the fitted curve of the carbohydrate consumption model 510 may be determined by regression analysis, such as least-mean-square regression analysis. In the illustrated embodiment, the fitted curve may be a third-degree polynomial. However, other types of approaches (e.g., curve-fitting approaches or modeling approaches) and other types of curves are contemplated to be within the scope of the present disclosure. Using the carbohydrate consumption model 510 of FIG. 5, the fitted curve may be utilized to determine a preliminary carbohydrate count for a person based on the age of the person. The preliminary carbohydrate count may then be scaled to determine the default carbohydrate consumption count for the person, as described in connection with FIG. 4. The default carbohydrate consumption count for the person may be used in place of actual carbohydrate counting to control insulin delivery or for other purposes. The data and model of FIG. 5 are exemplary, and it will be understood that different data will result in different models.

FIG. 6 shows a population carbohydrate consumption model 610 which relates body weight to carbohydrate intake for a population. In the illustrated embodiment, the carbohydrate consumption model 610 is a fitted curve which is fitted to carbohydrate count data 620 across body weight for a population. For clarity, not all of the carbohydrate count data in FIG. 6 are labelled with numeral 620. The body weight range covered by the carbohydrate consumption model 610 may vary. For example, the body weight range covered by the carbohydrate consumption model 610 may be limited to a smaller range of weights, or the body weight range covered by the carbohydrate consumption model 610 may cover a larger range of weights. A carbohydrate consumption model 610 which is limited in range may provide a more accurate model where sufficient data is available, whereas a carbohydrate consumption model 610 which covers a wider range may compensate for sparse data in certain weight groups. In the illustrated embodiment, the fitted curve of the carbohydrate consumption model 610 is fitted using the median carbohydrate counts of each body weight group, which are indicated by markers 622. Fitting to median carbohydrate counts is exemplary, and fitting to other metrics (e.g., mean carbohydrate counts) is contemplated to be within the scope of the present disclosure.

In various embodiments, the fitted curve of the carbohydrate consumption model 610 may be determined by regression analysis, such as least-mean-square regression analysis. In the illustrated embodiment, the fitted curve may be a second-degree polynomial. However, other types of approaches (e.g., curve-fitting approaches or modeling approaches) and other types of curves are contemplated to be within the scope of the present disclosure. Using the carbohydrate consumption model 610 of FIG. 6, the fitted curve may be utilized to determine a preliminary carbohydrate count for a person based on the body weight of the person. The preliminary carbohydrate count may be scaled to determine a default carbohydrate consumption count for the person, as described in connection with FIG. 4. The default carbohydrate consumption count for the person may be used in place of actual carbohydrate counting to control insulin delivery or for other purposes. The data and model of FIG. 6 are exemplary, and it will be understood that different data will result in different models.

FIG. 7 shows a population carbohydrate consumption model 710 which relates both age and body weight to carbohydrate intake for a population. In the illustrated embodiment, the carbohydrate consumption model 710 is a fitted surface which is fitted to carbohydrate count data across age and body weight. The age and body weight ranges covered by the carbohydrate consumption model 710 may vary. For example, the age and body weight ranges covered by the carbohydrate consumption model 710 may be limited to a smaller range, or the age and body weight ranges covered by the carbohydrate consumption model 710 may cover a larger range. A carbohydrate consumption model 710 which is limited in range may provide a more accurate model where sufficient data is available, whereas a carbohydrate consumption model 710 which covers a wider range may compensate for sparse data in certain age or body weight groups. In the illustrated embodiment, the fitted surface of the carbohydrate consumption model 710 is fitted using the median carbohydrate counts 722 of each age and body weight group. For clarity, not all median carbohydrate counts in FIG. 7 are labeled with numeral 722. Fitting to median carbohydrate counts is exemplary, and fitting to other metrics (e.g., mean carbohydrate counts) is contemplated to be within the scope of the present disclosure.

In various embodiments, the fitted surface of the carbohydrate consumption model 710 may be determined by multiple regression analysis. However, other types of surface-fitting approaches or modeling approaches are contemplated to be within the scope of the present disclosure. Using the carbohydrate consumption model 710 of FIG. 7, the fitted surface may be utilized to determine a preliminary carbohydrate count for a person based on the age and body weight of the person. The preliminary carbohydrate count may be scaled to generate a default carbohydrate consumption count for the person, as described above in connection with FIG. 4. The default carbohydrate consumption count for the person may be used in place of actual carbohydrate counting to control insulin delivery or for other purposes. The data and model of FIG. 7 are exemplary, and it will be understood that different data will result in different models.

Accordingly, FIGS. 5-7 show three examples of population carbohydrate consumption models which relate one or more characteristics to carbohydrate intake for a population. In accordance with aspects of the present disclosure, and with reference also to FIG. 4, as more carbohydrate count data is added to the carbohydrate consumption database 410, the carbohydrate consumption models 420 may be re-generated based on the added data. In various embodiments, older data which may no longer be representative of carbohydrate consumption trends may be retired and no longer used for generating the carbohydrate consumption models 420.

In accordance with aspects of the present disclosure, at least some of the carbohydrate consumption models 420 may be generated using machine learning systems and methods. As used herein, a "machine learning system" means and includes any computing device or computing system that implements any type of machine learning technique or machine learning model. As persons skilled in the art will understand, certain machine learning systems may have relatively high computational demands and may be implemented in a cloud computing system, such as the cloud computing system 108 of FIG. 1. Certain machine learning systems may have relatively low computational demands and may be implemented in a person's devices, such as the devices 102-106 of FIG. 1.

Figure 8:
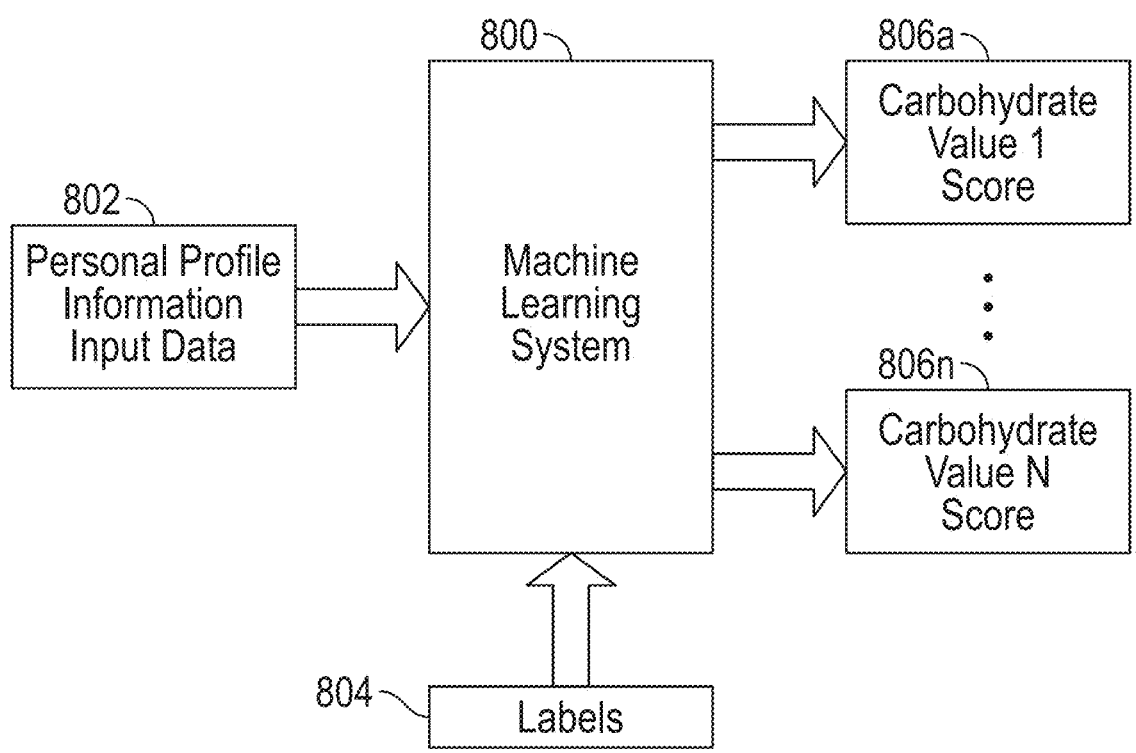
FIG. 8 is a block diagram of an exemplary machine learning system for providing a preliminary carbohydrate count, in accordance with aspects of the present disclosure.

With reference to FIG. 8, a block diagram for an exemplary machine learning system 800 is shown. The illustrated machine learning system 800 is configured to classify personal profile information 802 for a person into a preliminary carbohydrate count, in accordance with aspects of the present disclosure. In various embodiments, the machine learning system 800 may be a classical machine learning system or may be a deep learning neural network. As used herein, a "deep learning neural network" refers to and includes a neural network having several hidden layers and which does not require feature selection or feature engineering. A "classical" machine learning system, in contrast, refers to a machine learning system which requires feature selection or feature engineering.

The machine learning system 800 receives personal profile information 802 as input data and provides classification scores 806*a-n* as outputs. The term "classification scores" or "scores" may be used herein to indicate a vector of values, for a set of categories, which indicate how the categories apply to an input. In the embodiment of FIG. 8, the set of categories is N preliminary carbohydrate count values and the classification scores 806*a-n* correspond to the N preliminary carbohydrate count values, where N can be any number.

As an example, classification score 806*a* may correspond to a preliminary carbohydrate count of 15 grams, and classification score 806*n* may correspond to a preliminary carbohydrate count of 65 grams. Together with all of the classification scores in between (i.e., 16 to 64 grams), the classification scores 806*a-n* correspond to N=51 separate preliminary carbohydrate count values ranging from 15 grams to 65 grams. In this example, classification score 806*a* provides an indication of how a preliminary carbohydrate count of 15 grams corresponds to the personal profile information input data 802, and classification score 806*n* provides an indication of how a preliminary carbohydrate count of 65 grams corresponds to the personal profile information input data 802.

Thus, the illustrated machine learning system 800 provides N classification scores 806*a-n* which indicate how the N preliminary carbohydrate count values correspond to the personal profile information input data 802. In various embodiments, the highest classification score among the classification scores 806*a-n* may be selected, and the preliminary carbohydrate count value corresponding to the selected classification score may be used as the preliminary carbohydrate count 440 of FIG. 4.

In various implementations, the values of the classification scores 806*a-n* may be or may reflect probabilities. When the machine learning system 800 outputs classification scores 806*a-n* which are probabilities, each classification score may indicate the probability that its corresponding preliminary carbohydrate count value corresponds to the input data 802. In various embodiments, a machine learning system 800 may output classification scores 806*a-n* which may not be probabilities.

As persons skilled in the art will understand, the machine learning system 800 can be trained based on training data and based on ground truth labels 804 which reveal the true carbohydrate count corresponding to the training data. The input data and labels for training the machine learning system 800 may use the carbohydrate count entries for a population stored in the carbohydrate consumption database 410 of FIG. 4. As described above, each carbohydrate count entry in the database 410 may include personal profile information as well as a carbohydrate count. Thus, each carbohydrate count entry represents a particular correlation between personal profile information and a carbohydrate count, and such correlation may be used for training the machine learning system 800. The personal profile information may serve as the training data, and the carbohydrate counts may serve as the labels 804 for training the machine learning system 800. Persons skilled in the art will understand aspects of training a machine learning system and how to implement it.

The machine learning system 800 may be implemented in various ways, including by classical neural networks, deep learning neural networks, support vector machines, linear logistic regression, and/or other machine learning techniques, algorithms, and models. Persons skilled in the art will recognize such machine learning systems and how to implement them, including implementations using cloud computing platforms.

Figure 9:
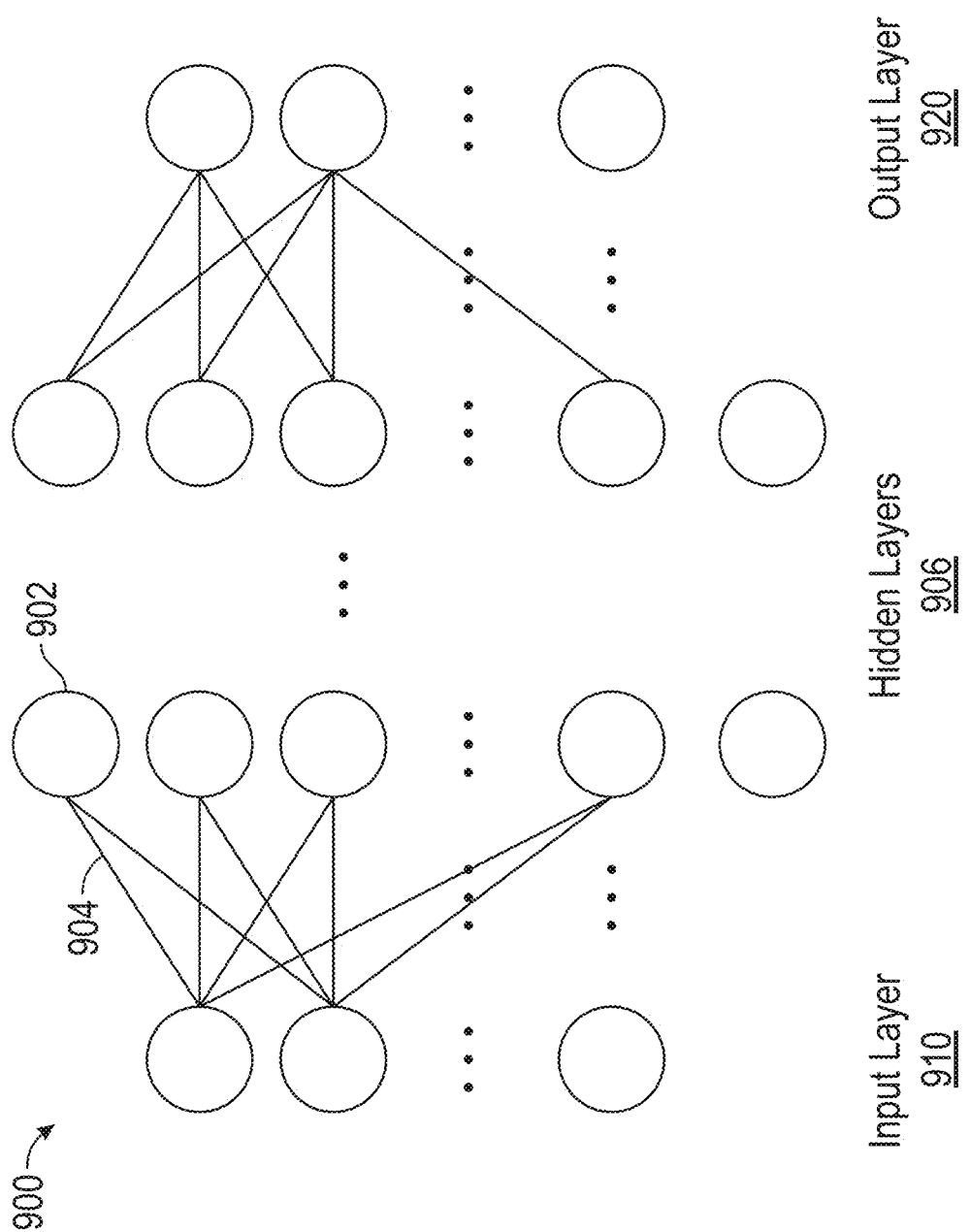
FIG. 9 is a diagram of an exemplary deep learning neural network, in accordance with aspects of the present disclosure.

As an example of a machine learning model, FIG. 9 shows a schematic diagram of an exemplary deep learning neural network for the machine learning system 800. The deep learning neural network 900 includes an input layer 910, a plurality of hidden layers 906, and an output layer 920. The input layer 910 receives personal profile information as input data. The input layer 910, the plurality of hidden layers 906, and the output layer 920 include neurons 902 (e.g., nodes). The neurons 902 between the various layers are interconnected via weights 904. The neurons 902 in the deep learning neural network 900 compute values by applying a specific function to the node values coming from the previous layer and based on the weights 904. Learning in the deep learning neural network progresses by making iterative adjustments to the weights 904 based on a large set of training data. The nodes of the output layer 920 provide the N classification scores (e.g., 806*a-n*, FIG. 8). The embodiment of FIG. 9 is exemplary, and other configurations and types of deep learning neural networks are contemplated to be within the scope of the present disclosure.

Accordingly, various population carbohydrate consumption models and various implementations for generating the population carbohydrate consumption models are described above. Also described above are implementations for determining a default carbohydrate consumption count for a person, which may be used in place of or as an alternative to carbohydrate counting for controlling insulin delivery to the person or for other purposes.

In various embodiments, a single default carbohydrate consumption count for a person may be used whenever the person consumes food, including for breakfast, lunch, dinner, and snacks. In various embodiments, a person may indicate, via a user interface of a device, that a default carbohydrate consumption count is to be used.

Figure 10:
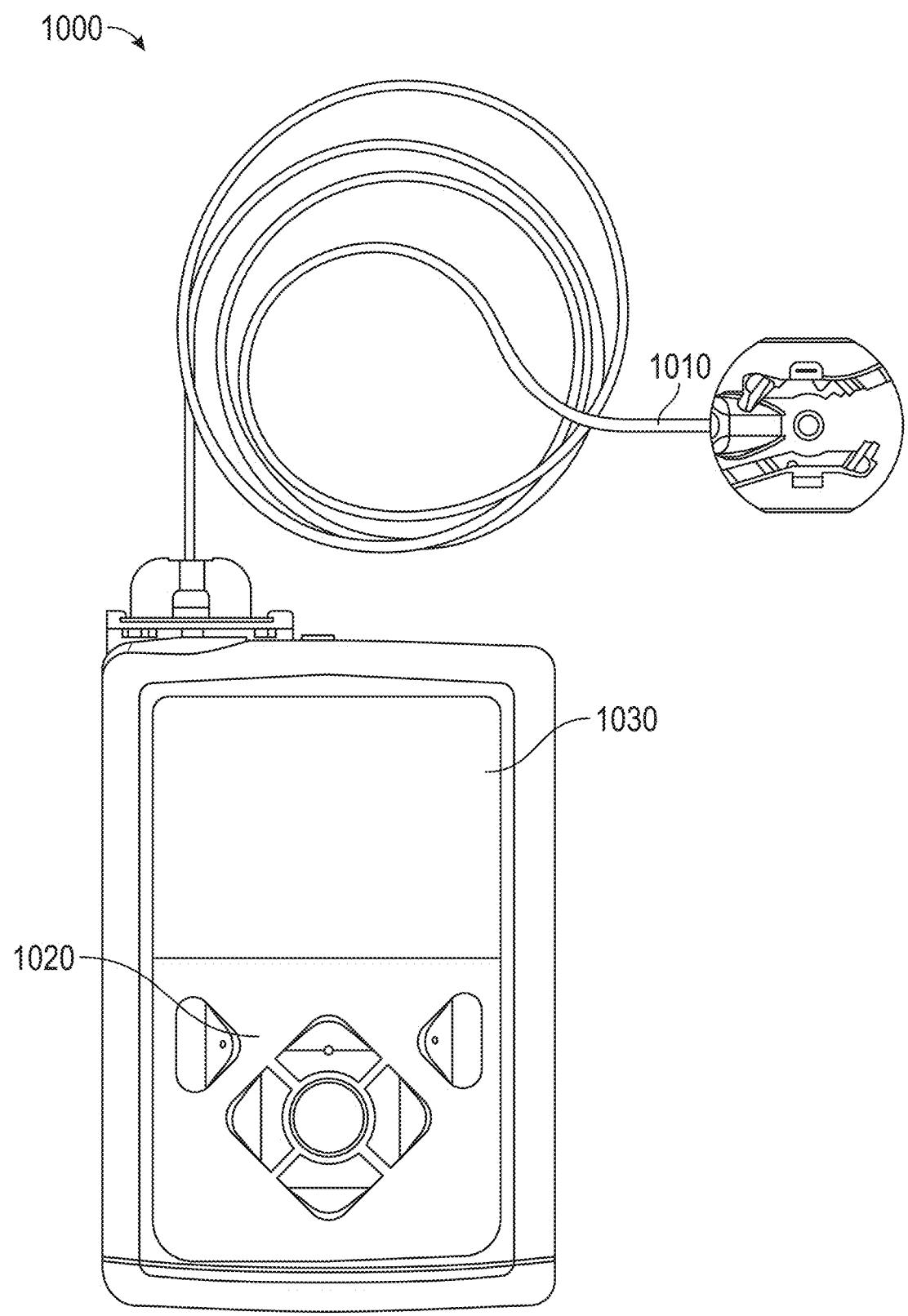
FIG. 10 is a diagram of an exemplary insulin delivery device, in accordance with aspects of the present disclosure.

An example of an integrated insulin delivery and computing device 1000 is shown in FIG. 10. In such a device, insulin delivery may be performed based on internal communication between a central computing module (e.g., a microcontroller for device 1000 as a whole) and an insulin delivery module (e.g., including a microcontroller, a motor, and a pump). For instance, insulin delivery may be caused by the central computing module communicating a delivery command in the form of an electrical signal that travels via a communication fabric to the insulin delivery module.

The insulin delivery device 1000 can provide fast-acting insulin through a small tube 1010 placed under the skin, delivering two types of doses: a basal dosage, which can be delivered continuously in tiny doses throughout the day and night, and a bolus dosage to cover an increase in blood glucose from meals and/or to correct high blood glucose levels. The illustrated insulin delivery device 1000 includes a user interface having button elements 1020 that can be manipulated to administer a bolus of insulin, to change therapy settings, to change user preferences, to select display features, and the like. The insulin delivery device 1000 also includes a display device 1030 that can be used to present various types of information or data to the user, such as, without limitation, the default carbohydrate consumption count stored in the insulin delivery device 1000. In accordance with aspects of the present disclosure, a user of the insulin delivery device 1000 may use the button elements 1020 to select and use the default carbohydrate consumption count as the carbohydrate count for a meal, and the selection can be confirmed using the display device 1030.

In accordance with aspects of the present disclosure, more than one default carbohydrate consumption count may be determined and used. For example, different default carbohydrate consumption counts may be determined for different types of meals, such as a default carbohydrate consumption count for breakfast, a default carbohydrate consumption count for lunch, a default carbohydrate consumption count for dinner, and a default carbohydrate consumption count for snacks. Such default carbohydrate consumption counts may be generated using meal-specific population carbohydrate consumption models. For example, a breakfast-specific population carbohydrate consumption model may be generated using carbohydrate count entries corresponding to breakfast times, a lunch-specific population carbohydrate consumption model may be generated using carbohydrate count entries corresponding to lunch times, and so on and so forth for a dinner-specific population carbohydrate consumption model and a snack-specific population carbohydrate consumption model. In various embodiments, and with reference to FIG. 10, the illustrated insulin delivery device 1000 may automatically cause the display device 1030 to display a meal-specific default carbohydrate consumption count based on time of day, and the user may use the button elements 1020 to select and use the displayed meal-specific default carbohydrate consumption count.

In the embodiment of FIG. 10, rather than selecting and using a default carbohydrate consumption count, a user may, at his or her option, use the button elements 1020 to raise or lower the carbohydrate count to another value and, in that manner, enter a manual carbohydrate count. The illustrated insulin delivery device of FIG. 10 is exemplary, and other types of insulin delivery devices and other operations different from those described above are contemplated to be within the scope of the present disclosure.

Figure 11:
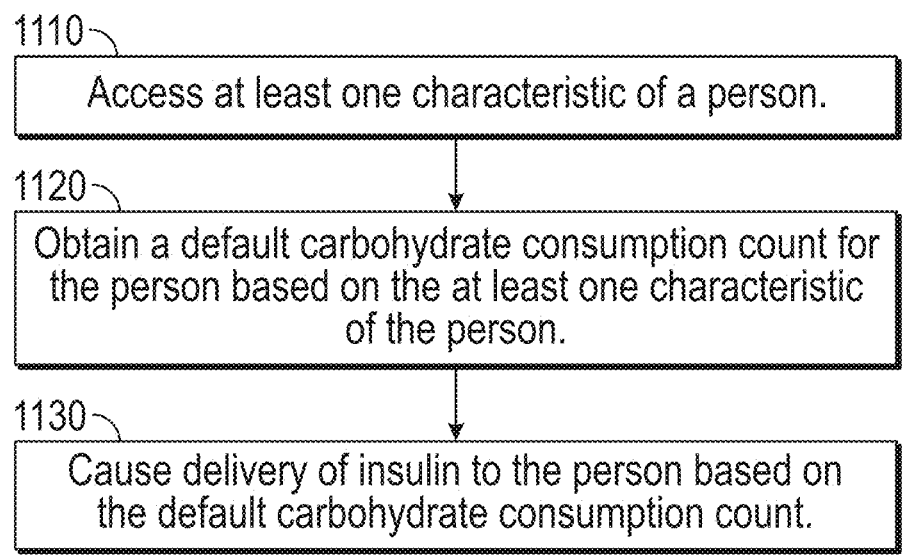
FIG. 11 is a flow diagram of an exemplary approach for obtaining and utilizing a default carbohydrate consumption count, in accordance with aspects of the present disclosure.

Referring now to FIG. 11, there is shown a flow diagram of an exemplary approach for obtaining and using a default carbohydrate consumption count. In various embodiments, the approach of FIG. 11 can be practiced using any of devices 102-106 of FIG. 1, by the device of FIG. 10, by any combination of such devices, or by other devices having one or more processors for executing instructions stored on one or more machine-readable storage media (e.g., one or more memory devices).

At block 1110, at least one characteristic of a person is accessed. The at least one characteristic may be any number of demographic characteristics, location characteristics, activity characteristics, and/or other characteristics. For example, the at least one characteristic may be the current age and/or body weight of the person.

At block 1120, a default carbohydrate consumption count is obtained for the person based on the at least one characteristic of the person. The default carbohydrate consumption count may be uniform for every meal. Additionally, or alternatively, the default carbohydrate consumption count may be applicable to any person having the same value of the at least one characteristic. This is because the default carbohydrate consumption count may be derived based on application of a population carbohydrate consumption model to the at least one characteristic of the person. The population carbohydrate consumption model may relate the at least one characteristic with carbohydrate intake for a population.

To illustrate, the at least one characteristic (e.g., age and/or body weight) may be provided as input to a population carbohydrate consumption model. A preliminary carbohydrate count (e.g., a median carbohydrate count of a population having the at least one characteristic) may be obtained as output of the population carbohydrate consumption model. The preliminary carbohydrate count may be converted into a default carbohydrate consumption count using a scaling factor (e.g., a percentage that is multiplied with the preliminary carbohydrate count). The scaling factor may be determined based on glycemic response simulations for simulated persons. For example, the scaling factor may be determined using an off-line simulator that predicts glycemic responses to insulin deliveries for different amounts of carbohydrates, and the amount of carbohydrates resulting in the best time-in-range may be used to back calculate the scaling factor. In some cases, the default carbohydrate consumption count may be set to a lower limit value (e.g., a minimum carbohydrate count) if the default carbohydrate consumption count is less than the lower limit value, and the default carbohydrate consumption count may be set to an upper limit value (e.g., a maximum carbohydrate count) if the default carbohydrate consumption count is greater than the upper limit value. For example, the lower limit value may correspond to the smallest insulin dosage that device 102 is capable of delivering, and the upper limit value may correspond to a safety limit (e.g., a predetermined portion of the person's total daily dose).

The default carbohydrate consumption count may be obtained using any number of a variety of devices. In some embodiments, device 102 and/or device 106 may obtain the default carbohydrate consumption count from system 108, which determines the default carbohydrate consumption count. In some embodiments, device 102 and/or device 106 may obtain the default carbohydrate consumption count based on locally determining the default carbohydrate consumption count. In some embodiments, device 102 and/or device 106 may obtain the default carbohydrate consumption count based on obtaining a preliminary carbohydrate count from system 108 and locally converting the preliminary carbohydrate count into the default carbohydrate consumption count.

As mentioned above, the default carbohydrate consumption count may be determined by system 108. For example, device 102 and/or device 106 may communicate, to system 108, a request for the default carbohydrate consumption count. The request may include the at least one characteristic, which system 108 may use to derive the default carbohydrate consumption count for communication back to device 102 and/or device 106.

As mentioned above, the default carbohydrate consumption count may be determined by device 102 and/or device 106. For example, device 102 and/or device 106 may communicate, to system 108, a request for a population carbohydrate consumption model. After obtaining the population carbohydrate consumption model, device 102 and/or device 106 may determine the default carbohydrate consumption count based on applying the population carbohydrate consumption model to the at least one characteristic of the person. The default carbohydrate consumption count may be maintained in one or more memory devices of device 102 and/or device 106.

As mentioned above, derivation of the default carbohydrate consumption count may be performed partly by system 108 and partly by device 102 and/or device 106. For example, device 102 and/or device 106 may communicate, to system 108, a request for a preliminary carbohydrate count. The request may include the at least one characteristic, which system 108 may use to determine the preliminary carbohydrate count for communication back to device 102 and/or device 106. Upon obtaining the preliminary carbohydrate count, device 102 and/or device 106 may determine the default carbohydrate consumption count based on applying a scaling factor to the preliminary carbohydrate count.

At block 1130, the default carbohydrate consumption count is used to cause delivery of insulin to the person. As described above herein, the default carbohydrate consumption count may be used in place of or as an alternative to a manual carbohydrate count to determine an amount of insulin to deliver to the person. Upon determining the amount, a signal (e.g., a delivery command) indicative of the amount may be communicated to an insulin delivery device (e.g., a component of device 1000 including a microcontroller coupled to a pump motor). In some embodiments, prior to communicating the signal, confirmation may be obtained from the person. For example, device 102 and/or device 106 may include a user interface that receives an input from the person instructing device 102 and/or device 106 to utilize the default carbohydrate consumption count for delivering insulin to the person. Thus, the user interface may not receive any manual carbohydrate count.

The approach of FIG. 11 is exemplary, and variations are contemplated to be within the scope of the present disclosure. For example, the approach may include additional blocks (which are not illustrated) for obtaining data indicative of a glycemic response to the insulin delivered to the person and for utilizing the data to determine an additional amount of insulin for delivery to the person. Such additional blocks may be iterated until a desired glucose level is achieved.

Figure 12:
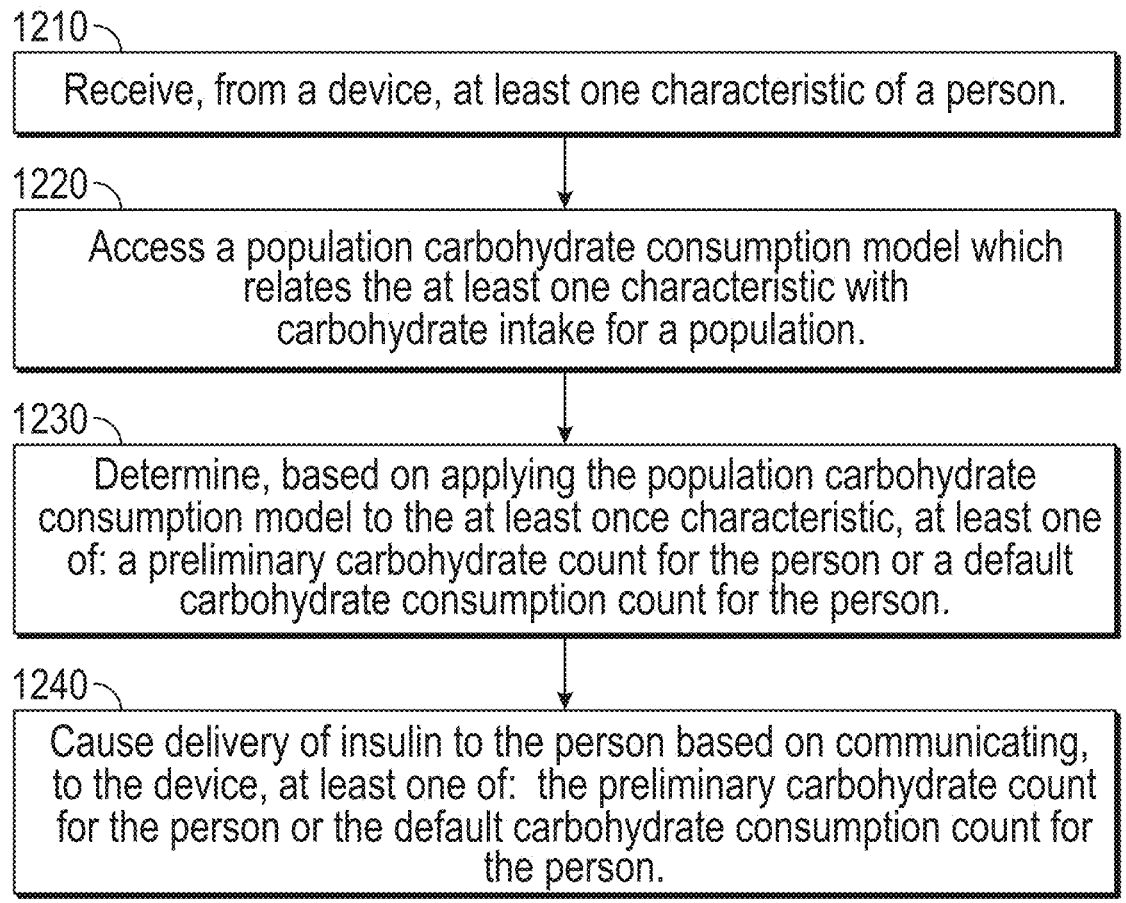
FIG. 12 is a flow diagram of an exemplary approach for providing a preliminary carbohydrate count or a default carbohydrate consumption count, in accordance with aspects of the present disclosure.

Referring to FIG. 12, there is shown a flow diagram of an exemplary approach for providing a preliminary carbohydrate count or a default carbohydrate consumption count. In various embodiments, the approach of FIG. 12 may be performed by the computing device 106 of FIG. 1, by the remote/cloud computing system 108 of FIG. 1, by the device of FIG. 10, by a combination of such devices and/or systems, and/or by another device or system having one or more processors for executing instructions stored on one or more machine-readable storage media (e.g., one or more memory devices).

At block 1210, at least one characteristic of a person is received from a device. For example, system 108 may receive the at least one characteristic from the delivery device 102 of FIG. 1 or may be another device (e.g., the computing device 106) which uses a carbohydrate count.

At block 1220, a population carbohydrate consumption model (which relates the at least one characteristic with carbohydrate intake for a population) may be accessed. For example, the population carbohydrate consumption model may be accessed from a database or from a memory device. The population carbohydrate consumption model may be generated based on regression analysis or machine learning (e.g., involving a deep learning neural network).

At block 1230, the population carbohydrate consumption model may be applied to the at least one characteristic to determine at least one of: a preliminary carbohydrate count for the person or a default carbohydrate consumption count for the person. For example, the current age and body weight of the person may be provided as input to the population carbohydrate consumption model, which relates the current age and body weight to carbohydrate intake for a population. The preliminary carbohydrate count may be obtained from application of the model to the current age and body weight, and a scaling factor may be applied to the preliminary carbohydrate count to derive the default carbohydrate consumption count. The scaling factor may be determined based on glycemic response simulations for simulated persons.

At block 1240, insulin delivery may be caused based on communicating, to the device, at least one of: the preliminary carbohydrate count for the person or the default carbohydrate consumption count for the person. For example, system 108 may communicate, to device 102 and/or device 106, the preliminary carbohydrate count or the default carbohydrate consumption count, either of which can be used by device 102 and/or device 106 to deliver an amount of insulin for counteracting a glucose level increase related to meal consumption. The approach of FIG. 12 is exemplary, and variations are contemplated to be within the scope of the present disclosure. For example, the approach may include additional blocks which are not illustrated.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described operations, methods, programs, algorithms, or codes may be converted to, or expressed in, a programming language or computer program embodied on a computer, processor, or machine-readable medium. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, Python, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

It should be understood that the foregoing description is only illustrative of the present disclosure. To the extent consistent, any or all of the aspects detailed herein may be used in conjunction with any or all of the other aspects detailed herein. Various alternatives and modifications can be devised by those skilled in the art without departing from the disclosure. Accordingly, the present disclosure is intended to embrace all such alternatives, modifications, and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A system comprising:
one or more processors; and
one or more memory devices storing instructions which, when executed by the one or more processors, cause performance of:
receiving, from a device, at least one characteristic of a person that is different from glucose measurement data of the person, the at least one characteristic being identified in a personal profile being stored on the device;
selecting a population carbohydrate consumption model from among a plurality of population carbohydrate consumption models based at least in part on the at least one characteristic identified in the personal profile, wherein the population carbohydrate consumption model relates the at least one characteristic with an amount of carbohydrate intake for a population;
determining, based on applying the population carbohydrate consumption model to the at least one characteristic, at least one of: a preliminary carbohydrate count for the person or a default carbohydrate consumption count for the person; and
causing delivery of insulin to the person based on communicating, to the device, at least one of: the preliminary carbohydrate count for the person or the default carbohydrate consumption count for the person.

2. The system of claim 1, wherein the default carbohydrate consumption count is determined based on the preliminary carbohydrate count and a scaling factor.

3. The system of claim 2, wherein the scaling factor is determined based on glycemic response simulations for simulated persons.

4. The system of claim 1, wherein:
the at least one characteristic of the person includes at least one of: age of the person or body weight of the person, and
the population carbohydrate consumption model relates at least one of age or body weight with carbohydrate intake for the population.

5. The system of claim 1, wherein the population carbohydrate consumption model is generated based on machine learning or regression analysis.

6. The system of claim 5, wherein the machine learning involves a deep learning neural network.

7. A processor-implemented method comprising:
receiving, from a device, at least one characteristic of a person that is different from glucose measurement data of the person, the at least one characteristic being identified in a personal profile being stored on the device;
selecting a population carbohydrate consumption model from among a plurality of population carbohydrate consumption models based at least in part on the at least one characteristic identified in the personal profile, wherein the population carbohydrate consumption model relates the at least one characteristic with an amount of carbohydrate intake for a population;
determining, based on applying the population carbohydrate consumption model to the at least one characteristic, at least one of: a preliminary carbohydrate count for the person or a default carbohydrate consumption count for the person; and causing delivery of insulin to the person based on communicating, to the device, at least one of: the preliminary carbohydrate count for the person or the default carbohydrate consumption count for the person.

8. The processor-implemented method of claim 7, wherein the default carbohydrate consumption count is determined based on the preliminary carbohydrate count and a scaling factor.

9. The processor-implemented method of claim 8, wherein the scaling factor is determined based on glycemic response simulations for simulated persons.

10. The processor-implemented method of claim 7, wherein:
the at least one characteristic of the person includes at least one of: age of the person or body weight of the person, and
the population carbohydrate consumption model relates at least one of age or body weight with carbohydrate intake for the population.

11. The processor-implemented method of claim 7, wherein the population carbohydrate consumption model is generated based on machine learning or regression analysis.

12. The processor-implemented method of claim 11, wherein the machine learning involves a deep learning neural network.

13. A non-transitory machine-readable medium storing instructions which, when executed by one or more processors, cause performance of:
receiving, from a device, at least one characteristic of a person that is different from glucose measurement data of the person, the at least one characteristic being identified in a personal profile being stored on the device;
selecting a population carbohydrate consumption model from among a plurality of population carbohydrate consumption models based at least in part on the at least one characteristic identified in the personal profile, wherein the population carbohydrate consumption model relates the at least one characteristic with an amount of carbohydrate intake for a population;
determining, based on applying the population carbohydrate consumption model to the at least one characteristic, at least one of: a preliminary carbohydrate count for the person or a default carbohydrate consumption count for the person; and
causing delivery of insulin to the person based on communicating, to the device, at least one of: the preliminary carbohydrate count for the person or the default carbohydrate consumption count for the person.

14. The non-transitory machine-readable medium of claim 13, wherein the default carbohydrate consumption count is determined based on the preliminary carbohydrate count and a scaling factor.

15. The non-transitory machine-readable medium of claim 14, wherein the scaling factor is determined based on glycemic response simulations for simulated persons.

16. The non-transitory machine-readable medium of claim 13, wherein:
the at least one characteristic of the person includes at least one of: age of the person or body weight of the person, and
the population carbohydrate consumption model relates at least one of age or body weight with carbohydrate intake for the population.

17. The non-transitory machine-readable medium of claim 13, wherein the population carbohydrate consumption model is generated based on machine learning or regression analysis.

18. The method of claim 7, wherein the at least one characteristic of the person includes at least one of a demographic characteristic, a personal characteristic, a location characteristic, or an activity characteristic of the person.

19. The method of claim 8, wherein the scaling factor is a personalized scaling factor for the person.

20. The method of claim 8, wherein the default carbohydrate consumption count for the person determined based on the preliminary carbohydrate count and the scaling factor is further bounded by a lower limit and an upper limit.

\* \* \* \* \*